(12) United States Patent
Glover et al.

(10) Patent No.: US 7,722,832 B2
(45) Date of Patent: *May 25, 2010

(54) SEPARATION METHOD AND ASSEMBLY FOR PROCESS STREAMS IN COMPONENT SEPARATION UNITS

(75) Inventors: John N. Glover, Spring, TX (US); Peter G. Ham, Houston, TX (US); Krishna K. Rao, Kingwood, TX (US); Stephen J. McGovern, Mantua, NJ (US)

(73) Assignee: Crystaphase International, Inc., Houston, TX (US)

( * ) Notice: Subject to any disclaimer, the term of this patent is extended or adjusted under 35 U.S.C. 154(b) by 616 days.

This patent is subject to a terminal disclaimer.

(21) Appl. No.: 11/136,631

(22) Filed: May 24, 2005

(65) Prior Publication Data

US 2005/0255014 A1 Nov. 17, 2005

Related U.S. Application Data

(63) Continuation-in-part of application No. 10/396,851, filed on Mar. 25, 2003, now Pat. No. 7,265,189.

(51) Int. Cl.
*B01J 8/06* (2006.01)
(52) U.S. Cl. .................. 422/190; 422/191; 422/195; 422/217
(58) Field of Classification Search .......... 422/190, 422/191, 195, 217
See application file for complete search history.

(56) References Cited

U.S. PATENT DOCUMENTS

| | | |
|---|---|---|
| 4,443,559 A | 4/1984 | Smith, Jr. |
| 4,711,930 A | 12/1987 | Hoelderich et al. |
| 4,719,090 A | 1/1988 | Masaki |
| 4,849,569 A | 7/1989 | Smith, Jr. |
| 4,859,642 A | 8/1989 | Hoelderich et al. |
| 4,950,834 A | 8/1990 | Arganbright et al. |
| 4,982,022 A | 1/1991 | Smith, Jr. et al. |
| 5,043,506 A * | 8/1991 | Crossland ............ 585/449 |
| 5,055,627 A | 10/1991 | Smith, Jr. et al. |
| 5,113,015 A | 5/1992 | Palmer et al. |
| 5,118,873 A | 6/1992 | Smith, Jr. |
| 5,189,001 A | 2/1993 | Johnson |
| 5,235,102 A * | 8/1993 | Palmer et al. ........... 562/607 |
| 5,243,115 A | 9/1993 | Smith, Jr. et al. |
| 5,248,836 A | 9/1993 | Bakshi et al. |
| 5,446,223 A | 8/1995 | Smith, Jr. |
| 5,476,978 A | 12/1995 | Smith, Jr. et al. |
| 5,510,056 A | 4/1996 | Jacobs et al. |
| 5,866,736 A * | 2/1999 | Chen .................. 585/323 |
| 6,242,661 B1 | 6/2001 | Podrebarac et al. |
| 6,262,131 B1 | 7/2001 | Arcuri et al. |
| 6,291,603 B1 | 9/2001 | Glover |
| 6,583,329 B1 | 6/2003 | Podrebarac |

FOREIGN PATENT DOCUMENTS

| | | |
|---|---|---|
| EP | 0 073 150 A2 | 3/1983 |
| GB | 429616 * | 12/1933 |
| GB | 429 616 A | 6/1935 |
| NL | 1 009 499 C1 | 1/2000 |

OTHER PUBLICATIONS

PCT International Search Report dated Jan. 25, 2007.
Sulzer—Structured packings for separation and reactive distillation Brochure, pp. 2-27 (2002/2003).
Rauschert Hiflow Rings Brochure, 5 pages.
M. Behrens et al., Performance of a Monolith-like Strutured, Chem. Biochem. Eng. Q. 15 (2) 49-57 (2001).
T.B. Sweeting et al., High Surface Reticulated Ceramics for Catalytic Applications, Mat., Res. Soc. Symp. Proc., vol. 549, pp. 17-23 (1999).
Z. Olujic et al., Distillation Column Internals/Configurations for Process . . . , Chem. Biochem. Eng. Q. 17 (4) 301-309 (2003).
T.J. Schildhauer, Application of film-flow-monoliths . . . , Technical University Delft, Julianalaan 136, NL-2628 BL Delft, The Netherlands 1 page (Oct. 29, 2003).
H. Wadley, Cellular Metals Manufacturing, Advanced Engineering Materials, 4, No. 10, pp. 726-733 (2002).
Norton Chemical Process Products Corporation, MacroTrap Guard Bed Media, 6 pages (1998).
Mills, Dr. Ken J., Ceramic Technology Provides Refining Solutions, Saint-Gobain Norpro, pp. 1-17 (2003).
Beihai Huihuang Chemical Packing Co. Ltd., http://77520.pub.diysite.com/sc.deliver/main/0-4-5/4/0-ma.html?siteid=77520, 10 pages (May 5, 2003).
L.J. Gibson, Cellular Solids, MRS Bulletin, www.mrs.org/publications/bulletin, pp. 270-274 (Apr. 2003).
D.J. Green et al., Cellular Ceramics: Intriguing Structures, Novel Properties, and Innovative Applications, www.mrs.org/publications/bulletin, pp. 296-300 (Apr. 2003).
P. Colombo, Porous Ceramics and Ceramic Components from Preceramic Polymers, http://www.matse.psu.edu/people/faculty/colombo.html, 5 pages.

(Continued)

*Primary Examiner*—Ling-Siu Choi
(74) *Attorney, Agent, or Firm*—Greenberg Traurig LLP

(57) ABSTRACT

A method and assembly for utilizing open-cell cellular solid material in a component separation unit to separate one or more process streams into component process streams having desired compositions. A method and assembly for using said open-cell cellular solid material to separate process streams into desired component process streams in a component separation unit, wherein the open-cell cellular solid material can include oxides, carbides, nitrides, borides, ceramics, metals, polymers, and chemical vapor deposition materials.

41 Claims, 16 Drawing Sheets

OTHER PUBLICATIONS

S. Kim et al., Effect of inert filler addition on pore size and porosity of closed-cell silicon oxycarbide foams, Journal of Materials Science 39, pp. 3513-3515 (2004).

D.T. Queheillalt et al., Synthesis of stochastic open cell Ni-based foams, Scripta Materialia 50, pp. 313-317 (2004).

Natural / Food Foams, 8 pages.

Lorna J. Gibson and Michael F. Ashby, Cellular Solids—Structure and Properties—Second Edition, Cambridge Solid State Science Series, Cambridge University Press.

* cited by examiner

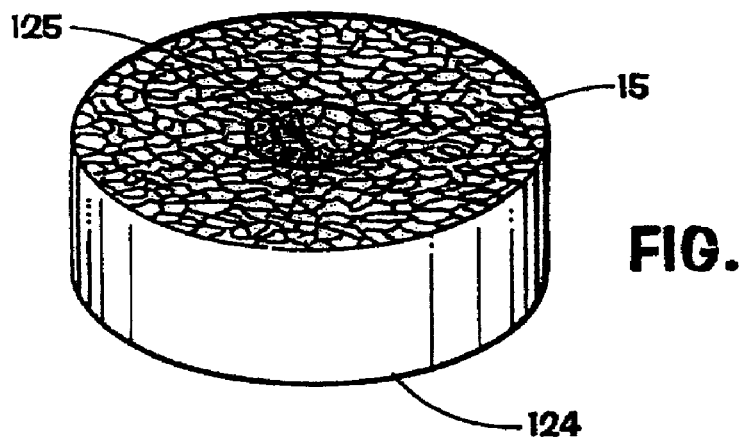
FIG. 6
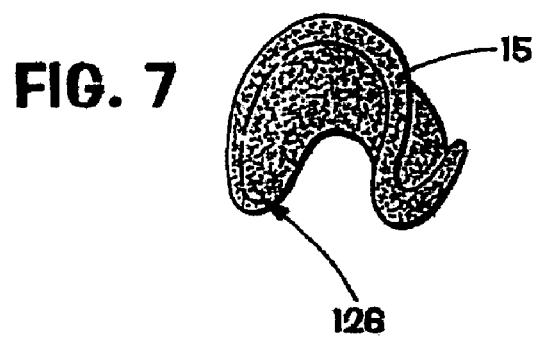
FIG. 7
FIG. 8
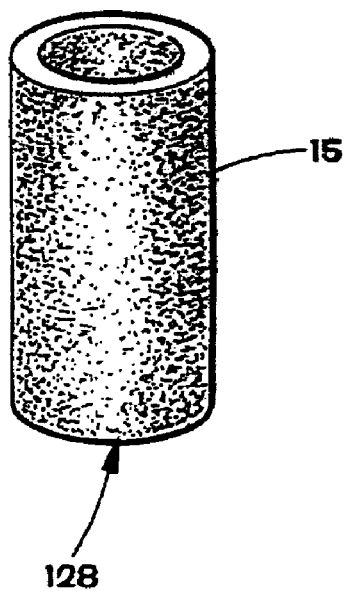
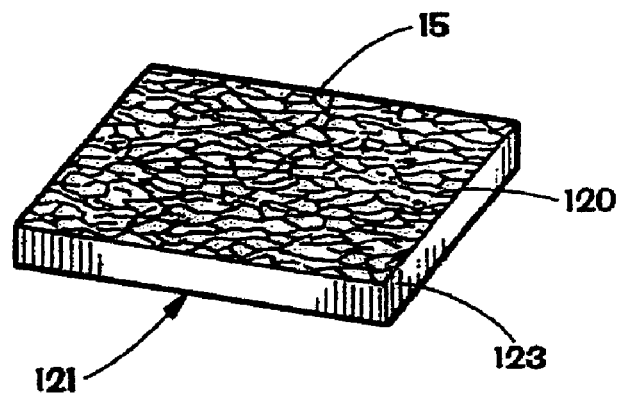
FIG. 9

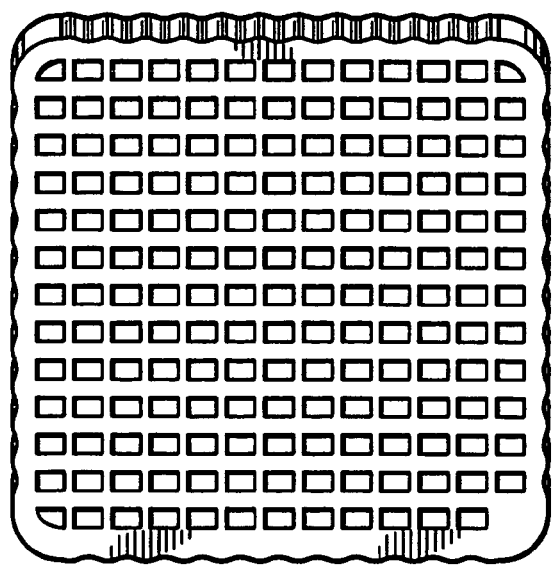
FIG. 14
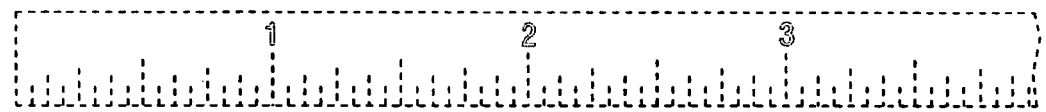
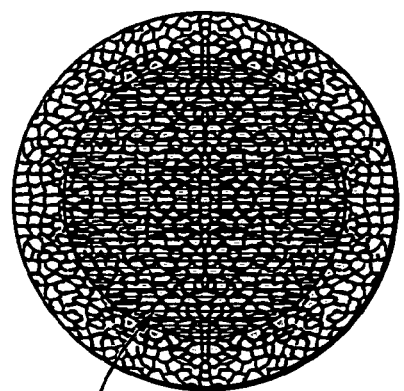
DYE DRIPPED ON THIS
SIDE OF DISK
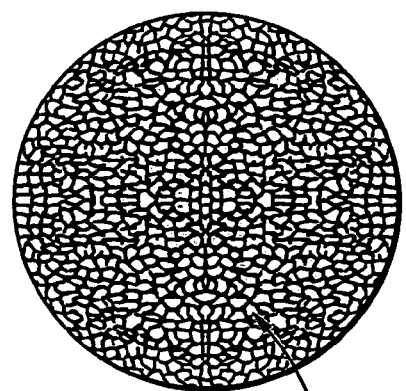
BOTTOM OF DISK AFTER
DYE RAN THROUGH
FIG. 21

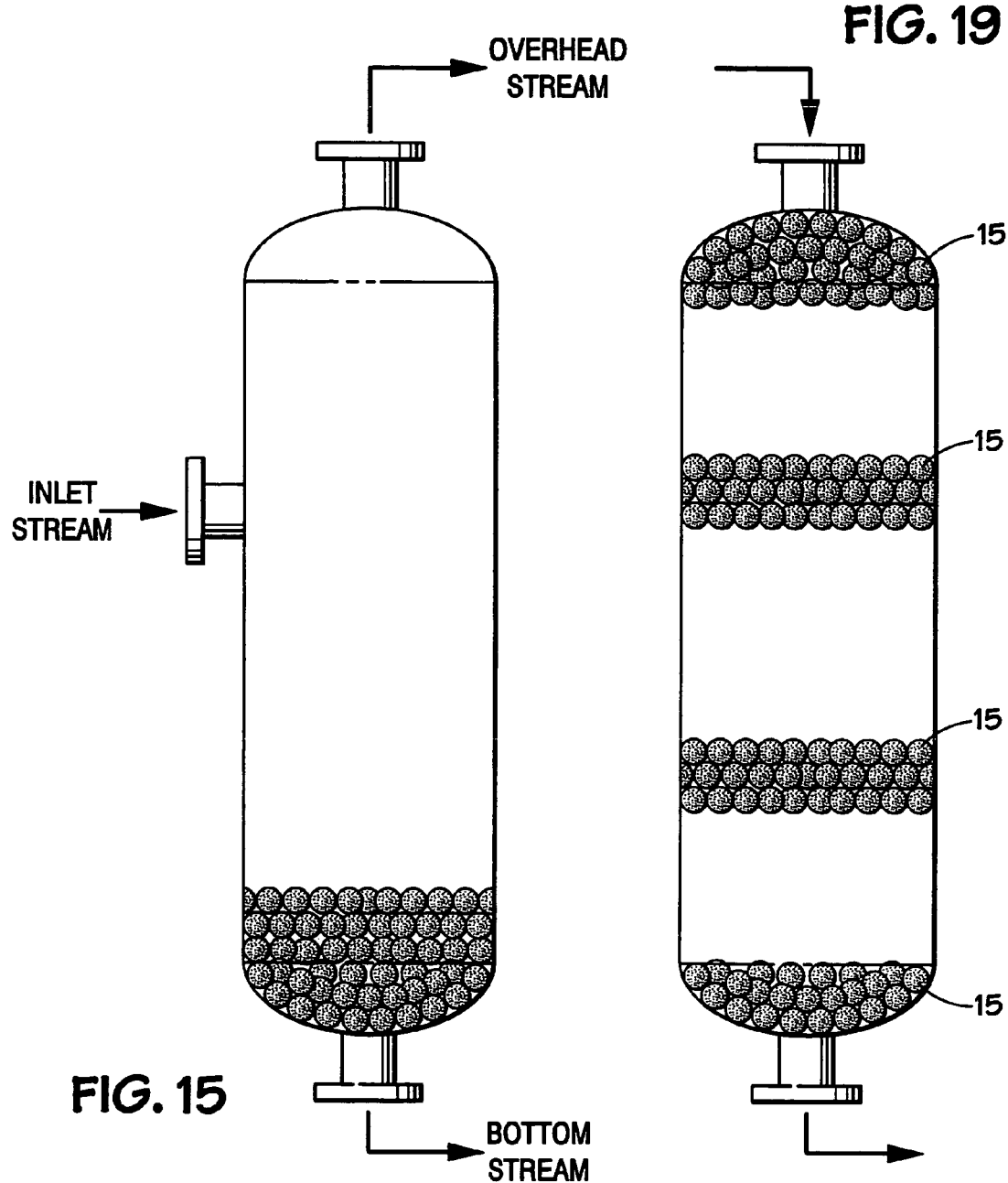
FIG. 19
FIG. 15
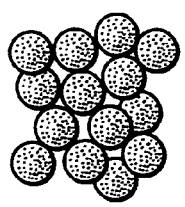
FIG. 16

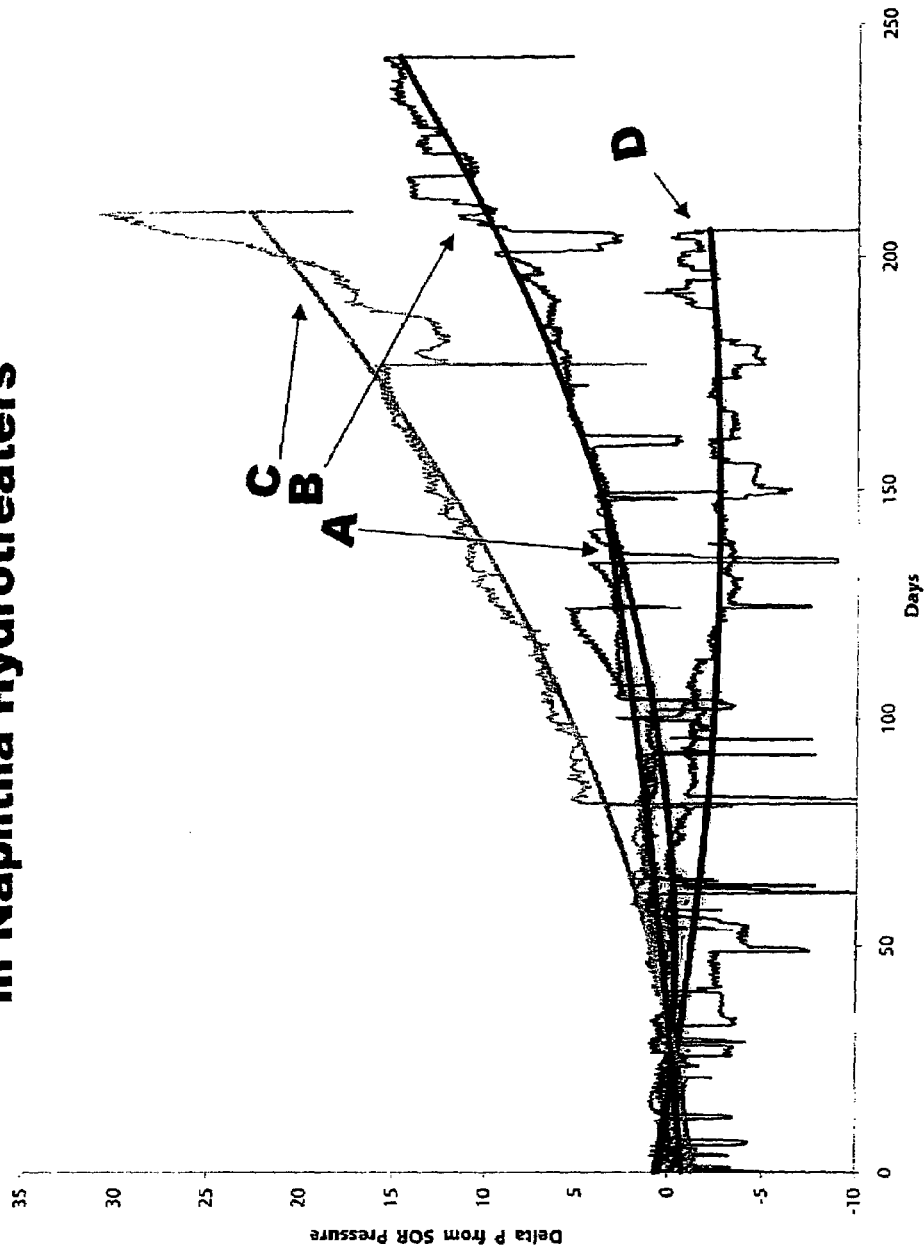

SEPARATION METHOD AND ASSEMBLY FOR PROCESS STREAMS IN COMPONENT SEPARATION UNITS

RELATED APPLICATION

This application is a continuation-in-part of U.S. patent application Ser. No. 10/396,851, filed on Mar. 25, 2003 now U.S. Pat. No. 7,265,189.

BACKGROUND OF THE INVENTION

1. Field of the Invention

The invention relates to a method of providing filtration of contaminants from process streams. In another aspect, this invention relates to a method for providing flow distribution of process streams in process units. In yet another aspect, this invention provides filtration or flow distribution or both while concurrently catalyzing at least one reaction to at least partially remove and/or convert certain chemical species within the process stream. In yet another aspect, this invention relates to a method and assembly for utilizing at least one cellular solid material in a component separation unit to separate one or more process streams into one or more component process streams having desired compositions.

2. Description of Related Art

Contaminants in process streams can be deleterious to processes and also to process units. Contaminants can damage process units, potentially resulting in an environmental or safety incident. Contaminants can also damage processes by decreasing efficiencies within processes, stopping production, affecting the specifications of products, or the like. Contaminants can be found in all types of process streams, such as feed streams, discharge streams, or effluent streams. Contaminants can affect various types of process units, such as reactors, extractors, distillation columns, scrubbers, tail gas treaters, incinerators, exchangers, boilers, condensers, and the like.

Process units may be configured such that process streams in the unit flows vertically downward or upward or both. Alternatively, process streams in the unit may flow radially from the center out or from the external part of the unit to the center or both.

Reactors are one type of process unit. Many reactors include discrete solid catalyst particles contained in one or more fixed beds. Catalyst beds are typically very efficient at trapping contaminants in process streams fed to the catalyst bed. Such catalyst beds, however, can quickly become clogged by these trapped contaminants. As the bed becomes clogged, pressure drop across the process unit rises resulting in eventual premature shutdown of the process unit.

Partly to mitigate this problem, catalyst bed process units as well as non-catalyst bed process units are often supplemented with conventional retention material beds that are somewhat less resistant to clogging. These conventional retention material beds are typically located at the inlet to the process unit. In the case of catalyst bed process units, the conventional retention material beds are typically inert to the reactions in the catalyst bed. These conventional retention material beds can be somewhat effective in trapping or filtering all or some contaminants such as dirt, iron oxide, iron sulfide, asphaltenes, coke fines, catalyst fines, salts, acidic impurities, sediments or other entrained foreign particulate material in the process stream entering, within or leaving the process unit. The trapping of the contaminants is to prevent undesirable material from clogging or poisoning or otherwise harming the process unit. When these conventional retention material beds are inert they are typically made of conventional ceramic materials in the form of pellets, rings, saddles or spheres and typically must be resistant to crushing, high temperatures and/or high pressures. While these conventional retention material beds can be somewhat effective in preventing the process unit from being clogged, the conventional retention material beds themselves eventually become clogged.

Conventional retention material beds may also facilitate flow distribution of the process stream in a direction perpendicular to the flow of the process stream across the process unit. Such behavior will be referred to herein as perpendicular flow distribution. As an example, in an upflow or down flow process unit, the process stream flow is in the axial direction and the perpendicular flow distribution is in the radial direction.

To increase the efficiency of conventional retention material beds, graduated layers of these materials in different sizes and shapes along with perforated discs, or screen baskets, have been used to retard the process unit from becoming clogged with contaminants such as dirt, iron oxide, iron sulfide, asphaltenes, coke fines, catalyst fines, sediments, or other entrained foreign particulate material.

Conventional retention material beds exposed to contaminants at the inlet to a process unit will eventually become clogged with contaminants. As this happens, the pressure drop across the process unit rises, resulting in the eventual shutdown of the unit. When this happens in catalyst bed process units, it is typical that part of the catalyst bed itself becomes somewhat or completely clogged with contaminants. After such shutdown of the process unit, skimming, or removal, of the clogged portion of the conventional retention material, as well as the clogged portion of the catalyst bed, is required.

In addition to clogging by contaminants in the process stream, polymerization of polymer precursors, e.g., diolefins, found in the process streams fed to catalyst bed process units may also foul, gum or plug such process units. In particular, two mechanisms of polymerization, free radical polymerization and condensation-type polymerization, may cause catalyst bed fouling, gumming or plugging. The addition of antioxidants to control free radical polymerization has been found useful where the process stream has encountered oxygen. Condensation polymerization of diolefins typically occurs after an organic-based feed is heated. Therefore, filtering prior to the process stream entering the catalyst bed process unit may not be helpful to remove these foulants as the polymerization reactions generally take place in the unit.

It is highly desirable to have retention materials that do not just clog with contaminants but efficiently and effectively filter contaminants from the process stream. Efficiency relates to the percent of contaminants removed by such materials from the process stream, as well as, to the range of sizes of contaminants that can be removed by such materials. Effectiveness relates to the extent that such materials do not impede the flow of the decontaminated process stream through the retention materials. Such materials would desirably remove virtually all contaminants within a broad range of sizes from the process stream, while not causing an unacceptable pressure drop increase across the process unit. It is also highly desirable to have retention materials that promote perpendicular flow distribution. The method of the present invention for filtration and flow distribution for process streams, when compared with previously proposed prior art methods, has the advantages of providing highly efficient and highly effective filtering of contaminants; increasing the life and activity of catalysts in catalyst bed process units; decreasing catalyst losses; enhancing product selectivities, increasing throughput/productivity, allowing for the optimization of process unit configuration; improving the perpendicular flow distribution of process streams into and within process units and eliminating the need to take process units off-line when conventional retention material beds have clogged to the point that pressure drop across units have risen to unacceptable levels. These benefits will result in both capital and operating cost savings, reduced downtimes, increased process unit performance and extended process unit operating time.

Weaknesses of conventional retention material beds are that they are neither particularly efficient nor particularly effective as filters. Conventional retention material beds are typically efficient at removing some contaminants from the process stream for a limited period of time. The contaminants so trapped are typically those about 50 microns and larger. The effectiveness of conventional retention material beds suffers due to eventual clogging, which prevents flow of the decontaminated process stream through the conventional retention material beds and leads to unacceptable increase in process unit pressure drop. Furthermore, conventional retention material beds appear to trap contaminants within about the top six to twelve inches of depth. Deeper beds of conventional retention materials do not increase the trapping capacity of these materials. Therefore, the art has sought filtration methods that remove particulate contaminants smaller than 50 microns, that filter particulate contaminants while allowing the free flow of decontaminated process streams with no significant rise in process unit pressure drop and that have a filtering capacity that increases with bed depth, regardless of bed depth.

Disadvantages associated with current perpendicular flow distribution designs and methods in process units may result in poor distribution within the process unit. Clogging or other fouling such as that caused by particulate contaminants or the products of undesired polymerization reactions may also cause maldistribution. The maldistribution may result in channeling and corresponding bypassing of portions of the process unit, reduction in the efficiency of contaminant removal and reduction in unit efficiency. Usually, a maldistribution problem is also evidenced by so-called temperature hot-spots. Such hot-spots can, for example, lead to increased coking and reduced activity in catalyst bed process units. Besides maldistribution problems and coking, the increase in pressure drop may cause catalyst breakdown as a result of attrition. Therefore, the art has sought a perpendicular flow distribution method that may distribute the process stream more uniformly within the process unit, provide efficient filtering of contaminants, reduce the occurrence of hot-spots, minimize catalyst attrition, and reduce fouling caused by undesired polymerization reactions.

U.S. Pat. Nos. 6,258,900 and 6,291,603, both of which are incorporated by reference in their entireties, describe reticulated ceramic materials that are used to filter and distribute organic feed streams in a chemical reactor. A need exists for filtering and flow distribution capabilities for other types of process streams besides organic-based streams and for other types of process units besides chemical reactors.

It is desirable for the filtering and flow distribution methods for all process streams and all process units to increase the filtering efficiency and effectiveness of materials utilized to remove contaminants from process streams, to improve perpendicular flow distribution within process units, to have unit run length determined by factors other than pressure drop increase, to minimize pressure drops across process equipment, and to maximize process safety and minimize environmental concerns arising from catalyst bed channeling and flow misdistribution, temperature hot-spots and process unit shutdowns and start-ups.

Component separation units are a specific type of process unit that have traditionally been used in laboratories, pilot plants and industrial facilities to separate process streams into component process streams having desired compositions. With regard to any component separation unit, a "process stream" can refer to a feed stream, "component process streams" can refer to product streams from the unit and "phases" can refer to individual liquid or vapor phases within the unit. During component separation, a phase moving in one direction and a phase moving in the opposite direction are contacted with one another within the component separation unit to effectuate mass transfer at the interface between the phases. Component separation is accomplished as a result of this mass transfer. As a result of the mass transfer, one or more process streams are separated to form one or more component process streams each having desired compositions. Typically, a plurality of trays and/or packing elements are positioned within the unit to facilitate contact between the phases and mass transfer between the phases. The trays are typically stacked horizontally with respect to one another, while the packing elements are randomly loaded or formed into a structured shape. Randomly loaded packing elements generally do not have any specified orientation relative to one another, while structured elements have a specific overall shape and relative orientation.

Examples of component separation units include, for example, distillation units, chromatographic units, absorbers, extractors and combinations thereof. Distillation units achieve component separation based on the differences in boiling points of the species present in the process streams fed to the unit. Distillation units include, for example, columns, fractionators, splitters, semi-continuous units, continuous units, flash units, batch distillation units, strippers, rectifiers, extractive distillation units, azeotropic distillation units, and vacuum distillation units. Absorbers and extractors are contacting units in which vapor and liquid phases are contacted and desired component separation is achieved based on the affinity of components in one phase to the components in the other phase. For example, a process stream containing components A and B may enter such a unit at one position while another process stream containing C may enter the unit at another position. One of these streams is typically liquid while the other can be liquid or vapor. Now assume component B has a much greater affinity for component C than for component A. Intimate contacting of the two streams in a properly designed and operated contacting unit will result in creating one product stream containing component A with a essentially no component B and a second product stream containing component C and essentially all of component B. Commercial use of such a unit might be driven by the difficulty of directly separating B from A versus of separating B from C. In this example the first product stream would be termed the desorbant and the second product stream would be termed the absorbant. Specific examples of absorber units include continuous absorbers, temperature swing absorbers, pressure swing absorbers, purge/concentration swing absorbers and parametric pumping. Extractors are contacting units in which immiscible liquid phases are contacted and component separation is achieved using a mass separating agent. In the example above, the component C in the second process stream would be the mass separating agent. An example of an extractor unit is an aromatics extraction unit wherein a hydrocarbon stream containing aromatic species and non-aromatic species are contacted with a mass separating agent such as sulfolane or morpholine and efficient contacting of these two immiscible liquids results in extraction of the aromatic species from the hydrocarbon steam into the stream containing the mass separating agent. Component separation units can also include a zone of catalytic materials to facilitate desired chemical reactions in the component separation unit. Examples of such include reactive distillation units and extractive distillation units. Examples of conventional unit internals used to achieve or enhance separation in component separation units include, for example, trays, randomly packed rings or saddles, structured packing having meshes, monoliths, gauzes and the like, collectors, distributors, downcomers, wall wipers, support grids and hold down plates.

Inside a component separation unit, there is repeated intimate contact between the rising phase and the falling phase. This contact is facilitated by the trays and/or packing materials. Each section of trays or depth of packing material may approximately represent a number of "theoretical stages" of separation. The component separation unit internals are designed and positioned within the component separation unit to produce the appropriate number of "theoretical stages" that will achieve the desired separation.

In distillation units the repeated contact between the phases ultimately results in a vapor phase consisting of higher volatility, lower boiling point species and a liquid phase consisting of lower volatility, higher boiling point species. This mass transfer between phases is driven by the differences between the boiling points of the species in the phases. Species with lower boiling points rise and components with higher boiling points fall. Upon creation of the one or more phases of desired composition, a portion of the vapor phase is typically recovered as an upper component process stream, and the remaining portion is condensed and passed as a reflux phase back into the distillation unit for further mass transfer. Likewise, a portion of the liquid phase is recovered as a lower component process stream, and the remaining portion is reboiled (i.e., vaporized) and returned to the distillation unit for further mass transfer. In addition, one or more component process streams can be recovered from the distillation unit at any location between the top and bottom of the distillation unit.

In component separation units, it is highly desirable to achieve efficient and cost effective separation within the unit. It is also highly desirable to achieve low pressure drop within the unit and a low HETP (height equivalent to a theoretical plate (or stage)) number for the unit. The degree of separation achieved by the unit may be affected by, among other factors, the amount of contact between the phases, the number of trays used, the amount and type of packing material used, the temperature and pressure at which the unit is operated, and the differences between the boiling points or other relevant separation characteristics of the species contained within the phases. Separation may also be affected by, for example, the design of the trays, the use of distributors in the unit to promote uniform distribution of phases across the cross-sectional area of the unit, and the design of the packing materials.

Prior art packing materials within component separation units have been either randomly loaded or structured. Randomly loaded or "loose" packing, although less costly than structured packing material, has been shown to have high pressure drop or low mass transfer characteristics, and suffer from poor phase distribution which results in poor separation efficiency in the unit. Also, prior art units that have utilized trays or "loose" packing materials have proven to be prone to corrosion and fouling and have provided inefficient separation. As a result, prior art loose packing technology gave way to the development of highly engineered structured packing technology. Structured packing materials can provide improved or separation efficiency; however, the manufacturing of structured packing material requires sophisticated machineries, engineering expertise and fabrication skills to design larger units to perfection. Further, these materials are generally more expensive to fabricate and require more unit down time for installation than random packing. Even though they are more costly, structured packing materials are often used in place of random packing because they provide higher production rates than existing units due to better pressure drop and mass transfer characteristics. The use of structured packing materials, however, has generally been limited to processes that are not subject to fouling or corrosion. Structured packing is more expensive and difficult to install, and so its use in processes where fouling or corrosion would necessitate more frequent replacement is economically unattractive.

Accordingly, prior to the development of the present invention, there has been no method and apparatus for separating process streams into component process streams having desired compositions in a component separation unit which provides the desirable characteristics and/or levels of: efficient separation at a low HETP value; relatively low pressure drop; resistance to fouling and/or corrosion; low fabrication and installation costs; ease of replacement; and improved overall performance and production. Therefore, the art has sought a method and apparatus for improving the separation of process streams into desired component process streams via distillation, absorption and/or extraction which: does not cause relatively large pressure drops; displays more efficient separation at a low HETP number; requires less complex and expensive design, fabrication, installation, operation and maintenance, resists fouling and corrosion, can be easily replaced and exhibits overall improved performance and production.

SUMMARY OF INVENTION

In accordance with the invention, the foregoing advantages have been achieved through the present method of filtering a process stream, for distributing a process stream within a process unit and for accomplishing one or both while concurrently catalyzing desired reactions. Yet another embodiment of the invention is separating one or more process streams into one or more component process streams having desired compositions in a component separation unit using specified forms of cellular solid materials. CELLDIST will be the name used to identify the specific forms of cellular solid materials used in the present invention. CELLDIST materials are three-dimensional cellular solids. Cellular solids are materials comprised of solid components or materials and cells. ("Cells" and "pores" are, for the purpose of this application, synonyms.) The solid material can be comprised of ceramics, metals, polymers and mixtures thereof. The cells can be open or closed or a combination of both. Open cells have windows into the cell said windows being of a size equal to or less than the size of the cell itself. Open-cell materials have passages between the cells through the windows in the cell. Closed-cell materials have no windows and no passages between cells. There are two basic structural forms of cellular solids: two-dimensional and three-dimensional. Two-dimensional cellular solids have cells that are translated in two dimensions. These typically form non-interconnected parallel channels. Honeycombs and monoliths are examples of two-dimensional cellular solids. There are two basic structural forms of three-dimensional cellular solids: periodic and stochastic. Three-dimensional periodic cellular solids are characterized by a unit cell that is translated throughout the structure with three-dimensional periodicity. Examples include ordered cell arrays such as hollow spheres and truss and lattice structures. Stochastic cellular solids have three-dimensional geometry with variation of cell sizes and shapes. These materials cannot be characterized by a single repeated unit cell. The randomness of the topology of these materials leads to the label "stochastic." An example of an open-cell stochastic cellular solid is ceramic foam. CELLDIST materials need not be purely stochastic nor purely periodic in topology. CELLDIST materials may be intentionally or unintentionally a combination of the two, the latter due to the imprecision of nature when it comes to attaining perfect periodicity and the opportunity at some level to formulate stochastic materials that have some semblance of periodicity. Cellular solids with substantially open cells are also called reticulated materials.

CELLDIST materials must also satisfy the requirements of separation. The requirements of separation of the present invention are driven by the need to achieve satisfactory capacity, phase contacting and pressure drop in component separation units. The requirements of separation require that the CELLDIST materials exhibit sufficiently open cells and low relative density. Recognizing the possible existence of an amount of closed cells in the CELLDIST material, sufficiently open cells have windows into sufficient open cells such that the average window size is greater than 10% of the size of the average cells (including open and closed cells), preferably averaging greater than 40% of the size of the average cell. Relative density is the density of the cellular solid divided by the density of the solid material itself. Relative density is low if it is 50% or less, preferably 30% or less.

In accordance with the invention, component separation units are a specific type of process unit used to separate process streams into one or more component process streams having desired compositions. With regard to any component separation unit, a "process stream" can refer to a feed stream, "component process streams" can refer to product streams from the unit and "phases" can refer to individual liquid or vapor phases within the unit. Examples of component separation units relevant to the invention include, for example, distillation units, adsorbers, extractors and combinations thereof. During component separation in, for example, a distillation unit, a phase moving in one direction and a phase moving in the opposite direction are contacted with one another within the component separation unit to effectuate mass transfer at the interface between the phases. During component separation in, for example, an adsorption unit, mass transfer is accomplished by causing desired species from one or more fluid phases to be adsorbed on the surface of suitably activated solid materials, including CELLDIST materials, packed within the unit. During component separation in, for example, an extraction unit, fluid phases are contacted within the unit to achieve desired mass transfer between the phases. Component separation is accomplished as a result of this mass transfer. As a result of the mass transfer, one or more process streams are separated to form one or more component process streams each having desired compositions.

Examples of component separation units relevant to the invention include, for example, distillation units, absorbers, extractors and combinations thereof. Distillation units achieve component separation based on the differences in boiling points of the species present in the process streams fed to the unit. Distillation units include, for example, distillation columns, fractionators, splitters, semi-continuous units, continuous units, flash units, batch distillation units, strippers, rectifiers, extractive distillation units, azeotropic distillation units, and vacuum distillation units and combinations thereof.

Absorbers and extractors are contacting units in which one or more fluid phases are contacted and desired component separation is achieved based on the affinity of components in one phase to either the components in the other phase or to suitably activated solid adsorbent materials packed in the unit. For example, a process stream containing components A and B may enter such a unit at one position while another process stream containing C may enter the unit at another position. One of these streams is typically liquid while the other can be liquid or vapor. Now assume component B has a much greater affinity for component C than for component A. Intimate contacting of the two streams in a properly designed and operated contacting unit will result in creating one product stream containing component A with a essentially no component B and a second product stream containing component C and essentially all of component B. Commercial use of such a unit might be driven by the difficulty of directly separating B from A versus of separating B from C. Specific examples of absorber units include continuous absorbers, temperature swing absorbers, pressure swing absorbers, purge/concentration swing absorbers and parametric pumping. Extractors are contacting units in which immiscible liquid phases are contacted and component separation is achieved using a mass-separating agent. In the example above, the component C in the second process stream would be the mass-separating agent. An example of an extractor unit is an aromatics extraction unit wherein a hydrocarbon stream containing both aromatic species and non-aromatic species are contacted with a mass separating agent such as sulfolane or morpholine and efficient contacting of these two immiscible liquids results in extraction of essentially all of the aromatic species from the hydrocarbon stream into the stream containing the mass separating agent. Component separation units can also include a zone of catalytic materials to facilitate desired chemical reactions in the component separation unit. Examples of such include reactive distillation units and extractive distillation units.

The present invention advantageously provides a method of removing contaminants from a contaminated process stream. The method preferably is performed by passing the process stream over a plurality of reticulated elements in a process unit. The reticulated elements are randomly packed in the process unit such that there is significant void space between each reticulated element to enhance filtration of contaminants on a surface of the reticulated elements while allowing the decontaminated process stream to pass unimpeded through the plurality of reticulated elements. A surface can include an inner surface and an outer surface. Reticulated elements made in accordance with the present invention will have more inner surface area available for filtering than outer surface area. Reticulated elements can include foam materials and monolith materials. Foam materials generally have a random pattern, while the monoliths have a more uniform pattern. The reticulated elements can be made from any commercially available materials, for example, zirconia toughened alumina, commonly referred to as ZTA. ZTA is available, in a ceramic foam, from Fiber Ceramics, Inc. headquartered in Cudahy, Wis. Another suitable type of ceramic is a monolith, which is manufactured by Corning, Inc. headquartered in Corning, N.Y. The process stream can be a liquid stream, a vapor phase, or a combination of both phases, and the contaminants can include dirt, iron oxide, iron sulfide, asphaltenes, coke fines, soot, catalyst fines, acidic impurities, sediments or other entrained foreign particulate matter, salts in distillation columns, particulates in gas streams, or sulfur or sulfides from tail gas units. The process stream can also be an organic-based process stream. The reticulated elements should be provided in an amount sufficient to remove some or all of the contaminants from the process stream. Another feature of the present invention may include the step of providing a decontaminated process stream for further processing.

More particularly, the invention relates to a process for improving stream quality of process streams entering to process units. An exemplary example includes improving stream quality of organic-based process streams going to catalytic bed process units. Preferably, the catalytic bed process units use discrete, solid element, fixed catalyst beds. The catalytic bed process units can include hydrotreater, hydrorefiner, hydrocracker, reformer, alkylation, dealkylation, isomerization, oxidation, esterification, and polymerization reactors. The discrete solid catalyst particles may be contained in one or more fixed beds and in either an upflow, down flow or radial flow design.

In addition to catalytic bed process units, the reticulated elements of the present invention can be used to remove contaminants from other types of process equipment. Such process equipment can include incinerators, scrubbers, tail gas treaters, and distillation columns and any manufacturing units that operate in a continuous fashion. When used to remove contaminants in a distillation column, the reticulated elements can be placed in the bottom of, or at any position in, the distillation column to act as a filter to remove salts or other contaminants from the distillation process. Removal of salts or other contaminants will reduce the pressure drop across the tower, allow for better separation efficiency in the column, and increase the time between downtimes typically required to remove these salts or other contaminants from the column.

The present invention also advantageously provides a method of perpendicular flow distribution in process units. This perpendicular flow distribution method includes providing one or more reticulated elements in the process unit. When only one reticulated element is used, it is typically large enough to effectively span the process unit. When multiple reticulated elements are used, they are typically arranged in a randomly packed bed. Regardless of the configuration of the reticulated elements, each reticulated element has a plurality of web members that define a plurality of flow passageways through the reticulated element. A process stream contacted with the plurality of reticulated elements is therefore subdivided into a plurality of smaller fluid streams by passing the process stream through the plurality of flow passageways defined by the web members of each reticulated element. The flows of the process stream through the flow passageways within the reticulated elements and through the void spaces between the reticulated elements when multiple reticulated elements are used provides for effective flow distribution perpendicular to the flow of the process stream through the process unit. This method can be applied to process streams that are entering the process unit, at any location within the process unit, at the exit from the process unit or any combination of these locations. This method can be applied to process streams while concurrently providing for filtration of contaminants from the process stream. This method can be applied to process streams while concurrently performing catalytic reactions to partially or totally remove or convert desired chemical species in the process stream.

An additional feature of the present invention can include the step of using reticulated elements in a variety of shapes. The shapes can include substantially spherical shaped balls, monoliths, squares, raschig rings, saddles, hollow cylinders, perforated disks, disks, single sheets, and solid cylinders, among others. Each shape can be sized to individual specifications. Sizes for the shapes used can include substantially spherical balls of about ⅛ to 2-inch diameters; monoliths with widths of about ⅛ to 2-inches and lengths of about ⅛ to 2-inches; squares with widths of about ⅛ to 2-inches and lengths of about ⅛ to 2-inches; raschig rings with inside diameters of about ⅛ to 1 inch and outside diameters of about ¼ to 1½ inches, and heights of about ¼ to 2 inches; saddle shapes with radii of about ¼ to 2 inches; hollow cylinders having inside diameters of about ⅛ to 1¼ inches, outside diameters of about ¼ to 2 inches, and heights of about ¼ to 3 inches; and solid cylinders having diameters of about ⅛ to 1 inch and heights of about ¼ to 2 inches. Custom-made one-piece disks or single sheet construction can be custom-fit to the physical configuration of a reactor. A further feature of this aspect of the present invention is that the reticulated elements can be formed in either a disk or single sheet, each optionally having perforations. An additional feature of the present invention is that the reticulated elements when constructed can be formed into a plurality of segments in order to form an assembled sheet or disk that is custom-fit to the reactor's physical configuration.

An additional feature of the present invention can include the step of using reticulated elements in a variety of porosities and pore sizes. The reticulated elements can be manufactured such that they have a porosity of so many pores per inch ("ppi"). For example, this means that a reticulated element of 30 ppi will, when examined by one skilled in the art, have on average 30 pores per inch. Given that there are about 25 millimeters per inch, the pore sizes of such a material would be just under one millimeter. Pore size in this context is the general size of the cavity of the pore recognizing that pores are not perfect spheres. Another important element of pore size is the size of the window opening into the pore. It is this measure that determines the size of the largest particle that is trapped or filtered within the pore. The porosity range of the reticulated elements of the present invention is from about 4 to about 800 ppi. This enables customization of the size and shape of the reticulated elements for the application constraints including particulate loading and pressure drop constraints. The pores of the reticulated elements can be in a range of about 6 millimeters to about 100 microns, each being defined by a plurality of web members forming a plurality of flow passageways through the reticulated elements. The surface area of these materials can vary even if the ppi value remains constant.

An additional feature of the present invention can include the step of using reticulated elements with different pore sizes in the same process unit so as to remove contaminant materials of a broad range of sizes. The materials of the present invention can filter contaminants down to about 1 micron in size. Commercially available retention materials are capable of trapping particles down to about 50 micron in size.

Another feature of the present invention advantageously provides providing a plurality of reticulated elements over an entire length of a process unit. The plurality of reticulated elements can be commingled throughout the process unit with a catalyst, with multiple catalysts or with other materials, such as structured packing materials and the like.

In accordance with another aspect of the present invention, the step of contacting the contaminated process stream with the reticulated elements may include depositing a catalyst on the reticulated elements prior to contacting the contaminated process stream. Another feature of this aspect of the present invention may include the use of reticulated elements as a substrate having a substantially uniform coating of a selected catalyst including a porous alumina coating with a Group VI-B metal or a Group VIII metal, or both. Preferably, the Group VI-B metal is molybdenum and preferably, the Group VIII metal is either nickel or cobalt. More preferably, the Group VI-B metal and Group VIII metal are impregnated into the reticulated elements. The method of the present invention is useful to extend the run life of the catalyst bed. The catalytically active reticulated elements can be utilized to react diolefins or other polymer precursors and also to act as a filter and as a flow distributor. By filtering solids and partially reacting any polymer precursors, e.g., diolefins, fouling of the catalyst is reduced effectively extending the run time of the reactor.

In accordance with another aspect of the present invention, the filtration method may include the step of filtering solid particulate material or sediments that form within a process unit in order to reduce fouling or plugging of downstream equipment. This aspect of the present invention may include the steps of providing one or more reticulated elements; contacting a process stream containing the particulate material or sediments with the reticulated elements; removing the particulate material or sediments from the process stream; and providing a relatively particulate material or sediments-free process stream for further processing. The reticulated elements can be located at one or more locations within the process unit or at the outlet of the process unit or a combination of both. This method of removing sediments can also be used in distillation columns to provide a relatively sediment free process stream for further processing. The method of the present invention for filtering process streams in catalytic bed process units, when compared with prior art methods, has the advantages of reducing the volume of retention materials required; lowering capital costs; improving the filtration of the solid particular matter from the feed streams; decreasing the pressure drop across the system; increasing run time of the reactor; allowing for the use of catalysts that have higher activity, lowering operating costs; increasing process safety; and reducing environmental concerns.

In accordance with another aspect of the invention, the foregoing advantages have also been achieved through the present apparatus and method for separating at least one process stream into one or more component process streams having desired compositions using CELLDIST materials in a component separation unit.

The method may include the steps of providing CELLDIST materials in the component separation unit, positioning the CELLDIST materials within at least one zone of the component separation unit (hereinafter referred to as the "unit"), introducing two or more phases of the process stream into the zone containing the CELLDIST materials, contacting the two or more phases at or near the surface of the CELLDIST materials to facilitate mass transfer and recovering at least a portion of one or more of the phases from the unit as one or more component process streams, wherein the component process streams have a desired composition.

A feature of the present invention is that the phases have desired compositions upon exiting the zone of CELLDIST material. One or more component process streams can be recovered from one or more locations between the top of the unit and the bottom of the unit. In one embodiment, the surface of the CELLDIST material can have a surface area of up to about 4000 square meters per cubic meter of CELLDIST material in the unit. Preferably, the surface of the CELLDIST material has a surface area in the range of about 250-4000 square meters per cubic meter of CELLDIST material in the unit.

In one aspect, the solid component of the CELLDIST materials in the unit can be selected from the group consisting of oxides, carbides, nitrides, borides, a ceramic material, a metallic material, a polymeric material and a chemical vapor deposition material or combinations thereof. CELLDIST material can also be formed from a corrosion resistant material or predominantly from silicon carbide.

A feature of the present invention is that the component separation unit can include both CELLDIST materials and one or more conventional unit internals. The process streams entering the unit may be vapor steams, liquid streams or a combination of both. One or more phases contained within the unit can be passed through one or more zones of CELLDIST material installed within the unit.

In accordance with another aspect of the present invention, a method of altering the composition of at least one process stream in a component separation unit can include positioning at least one bed of CELLDIST material within a unit, creating two or more desired phases from the at least one process stream, passing the two or more phases through the at least one bed of CELLDIST material, whereby the composition of the two or more phases is changed as it passes through the CELLDIST material, thereby producing at least one component process stream with a desired composition, and recovering the at least one component process stream from the unit. A feature of the invention is that one or more component process streams are recovered from locations between the top of the unit and the bottom of the unit. In one aspect, the bed or beds of CELLDIST material are custom fit to the cross sectional configuration of the unit. In another aspect, the bed or beds of CELLDIST material is comprised of a plurality of randomly packed elements.

In accordance with another aspect of the present invention, a method of altering the composition of at least one process stream via distillation in a distillation unit can include positioning at least one bed of CELLDIST material within a distillation unit, creating desired phases from the at least one process stream, passing the phases through the at least one bed of CELLDIST material, whereby the composition of the phases is changed as it passes through the CELLDIST material, thereby producing at least one component process stream with a desired composition, and recovering the at least one component process stream from the distillation unit. A feature of the invention is that one or more component process streams are recovered from locations between the top of the distillation unit and the bottom of the distillation unit. In one aspect, the bed or beds of CELLDIST material are custom fit to the cross sectional configuration of the distillation unit. In another aspect, the bed or beds of CELLDIST material is comprised of a plurality of randomly packed CELLDIST elements.

In accordance with another aspect of the present invention, a method of altering the composition of at least one process stream via absorption in a absorber can include positioning at least one bed of CELLDIST material within an absorber, creating two or more desired phases from the at least one process stream, passing the two or more phases through the at least one bed of CELLDIST material, whereby the composition of the two or more phases is changed as they pass through the CELLDIST material, thereby producing at least one component process stream with a desired composition, and recovering the at least one component process stream from the absorber. A feature of the invention is that one or more component process streams are recovered from locations between the top of the absorber and the bottom of the absorber. In one aspect, the bed or beds of CELLDIST material are custom fit to the cross sectional configuration of the absorber. In another aspect, the bed or beds of CELLDIST material is comprised of a plurality of randomly packed CELLDIST elements.

In accordance with another aspect of the present invention, a method of altering the composition of at least one process stream via extraction in an extractor can include positioning at least one bed of CELLDIST material within a extractor, creating desired phases from the at least one process stream, passing the phases through the at least one bed of CELLDIST material, whereby the composition of the phases is changed as it passes through the CELLDIST material, thereby producing at least one component process stream with a desired composition, and recovering the at least one component process stream from the extractor. A feature of the invention is that one or more component process streams are recovered from locations between the top of the extractor and the bottom of the extractor. In one aspect, the bed or beds of CELLDIST material are custom fit to the cross sectional configuration of the extractor. In another aspect, the bed or beds of CELLDIST material is comprised of a plurality of randomly packed CELLDIST elements.

Another aspect of the present invention involves facilitating the separation of process streams into component process steams via mass transfer in a component separation unit. The unit preferably has one or more beds of CELLDIST material. Such one or more beds can be composed of a plurality of randomly packed CELLDIST material or CELLDIST material that is custom fit to the unit's cross sectional configuration or a combination thereof. The depths of the one or more beds is set so as to provide the required number of theoretical stages to achieve the desired separation of some or all of one or more of the species in the process streams.

In yet another aspect, the present invention relates to a component separation unit assembly with at least one CELLDIST material disposed therein, wherein the amount of at least one CELLDIST material in the unit preferably is sufficient to provide the number of theoretical stages required to separate one or more process streams into component process streams containing desired compositions of certain of the species in the one or more process streams.

The methods and assemblies of the present invention for separating one or more process streams into component process streams having desired compositions using CELLDIST materials in a component separation unit, when compared with prior art methods, have the advantages, among others, of reducing the complexity and cost of designing, fabricating, installing, operating and maintaining units and of providing more efficient contacting of process streams to achieve the desired separation.

BRIEF DESCRIPTION OF THE DRAWINGS

In the drawings:

FIG. 6 is a perspective view of a perforated disk made of reticulated material in accordance with the present invention;

FIG. 7 is a perspective view of a saddle made of reticulated material in accordance with the present invention;

FIG. 8 is a perspective view of a hollow cylinder made of reticulated material in accordance with the present invention;

FIG. 9 is a perspective view of an example of a one-piece sheet made of reticulated material in accordance with the present invention;

FIG. 14 is a perspective view of a monolith made of reticulated material in accordance with the present invention;

FIG. 15 is a partial cross-sectional side view of a distillation column showing an embodiment of the present invention;

FIG. 16 is a perspective view of a layer of reticulated elements with a void space between each reticulated element that is varied in accordance with the present invention;

FIG. 18 is a graph illustrative of the effect of the present invention on the pressure drop in naphtha hydrotreater units;

FIG. 19 is a partial cross-sectional side view of a downflow process unit with multiple layers of reticulated elements to provide the methods of the present invention at the entrance of the process unit, at two other locations within the process unit and at the outlet of the process unit in accordance with an embodiment of the present invention;

FIG. 21 is a perspective view of a top and a bottom of a piece of a reticulated element on which had been dripped water tinted with food coloring illustrating the perpendicular flow distribution of the reticulated elements in accordance with the present invention;

While the invention will be described in connection with the preferred embodiment, it will be understood that it is not intended to limit the invention to that embodiment. On the contrary, it is intended to cover all alternatives, modifications, and equivalents, as may be included within the spirit and the scope of the invention as defined by the appended claims.

DETAILED DESCRIPTION AND SPECIFIC EMBODIMENTS

Figure 1:
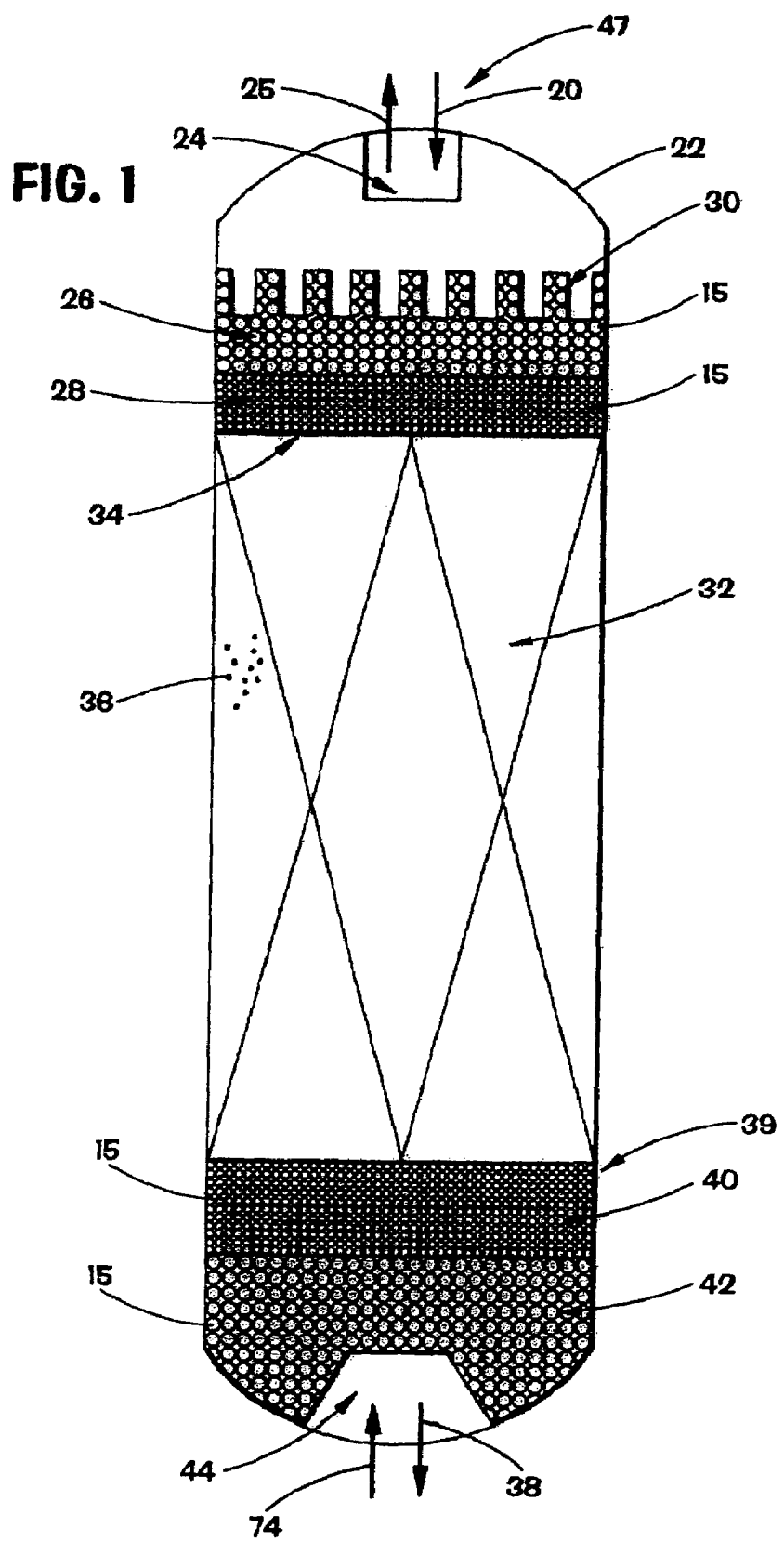
FIG. 1 is a partial cross-sectional side view of a single fixed catalytic bed process unit showing a specific embodiment of the present invention.
Figure 11:
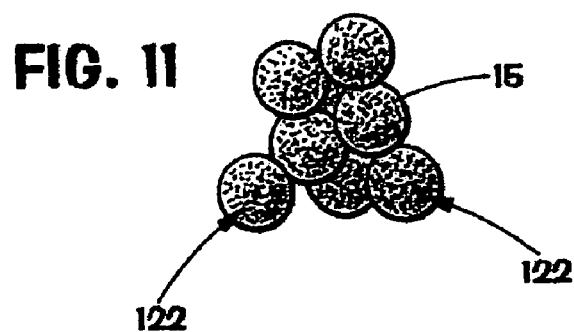
FIG. 11 is a perspective view of balls made of reticulated material in accordance with the present invention.

With reference to FIG. 1, for treatment of a process stream a single fixed catalytic bed process unit 22 with reticulated elements 15 in the shape of substantially spherical balls 122 (FIG. 11) will be described, although as previously discussed other shapes of the reticulated elements 15 may be used, as well as other process units. If the process unit 22 is of a down flow configuration, the contaminated process stream 20 will enter the process unit 22 at the inlet 24. The invention may be used in either fixed or fluidized catalytic bed process units. Preferably, the present invention is used in one or more fixed beds, in either an up flow or down flow or radial flow configuration. Preferably, the catalytic bed process units include hydrotreater, hydrorefiner, hydrocracker, reformer, alkylation, dealkylation, isomerization, esterification, and polymerization reactors. Contaminants typically found in the feed stream include dirt, iron oxide, iron sulfide, asphaltenes, coke fines, soot, catalyst fines, sediments or other entrained foreign particulate matter, salts in distillation columns, particulates in gas streams, sulfur or sulfides from tail gas units, or polymer precursors such as diolefins. A layer 26, preferably layers 26, 28, of reticulated elements 15 is provided in the vessel in an amount sufficient to filter the contaminants from the process stream 20 for as long as desired including, but not limited to, as long as the catalyst within the reactor is sufficiently active to justify operation of the reactor. Preferably, multiple layers 26, 28 can be provided wherein the size of the reticulated elements 15 such as balls 122 is graduated from one size in layer 26 to another size in layer 28 as the incoming process stream flows through the bed of reticulated elements 15. Reticulated elements can include foam materials and monolith materials. Foam materials generally have a random pattern, while the monoliths have a more uniform pattern. If a reticulated ceramic element is used, the reticulated ceramic elements can be made from any commercially available materials, for example, zirconia toughened alumina, commonly referred to as ZTA. ZTA is available from Fiber Ceramics, Inc. headquartered in Cudahy, Wis. An exemplary monolith for use in the present invention is available from Corning, Inc. headquartered in Corning, N.Y. The graduated sizing of the reticulated elements 15 allows the filtering of a broad range of sizes of contaminants.

The present invention advantageously provides a method of removing contaminants from a contaminated process stream. The method preferably is performed by providing reticulated elements preferably randomly packed with a void space between each reticulated element to enhance filtration of contaminants in such a way that the decontaminated process stream may pass through the reticulated material unimpeded. The present invention provides a method whereby the entirety of the reticulated elements can be utilized to filter contaminants from the process stream. In catalytic bed process units, the reticulated elements can be sized such that the catalyst bed has exhausted its catalytic activity before the reticulated elements have exhausted their ability to filter out contaminant particles. This method enables use of the entire bed of reticulated elements, as opposed to current methods that eventually clog the top six to twelve inches of the retention materials conventionally available. With such materials, beds deeper than about one foot are essentially of no use in removing particulate contaminants from process streams. Further, with such materials, once the top of the bed is plugged, the pressure drop in the equipment begins to escalate, requiring a shutdown to remove and replace the clogged materials from the process unit.

Data has been collected from different process units that have experimented with the reticulated elements of the present invention. The reticulated elements of the current invention have performed dramatically better than conventional retention materials available commercially.

EXAMPLE 1

Use in a Distillate Hydrotreater

Figure 17:
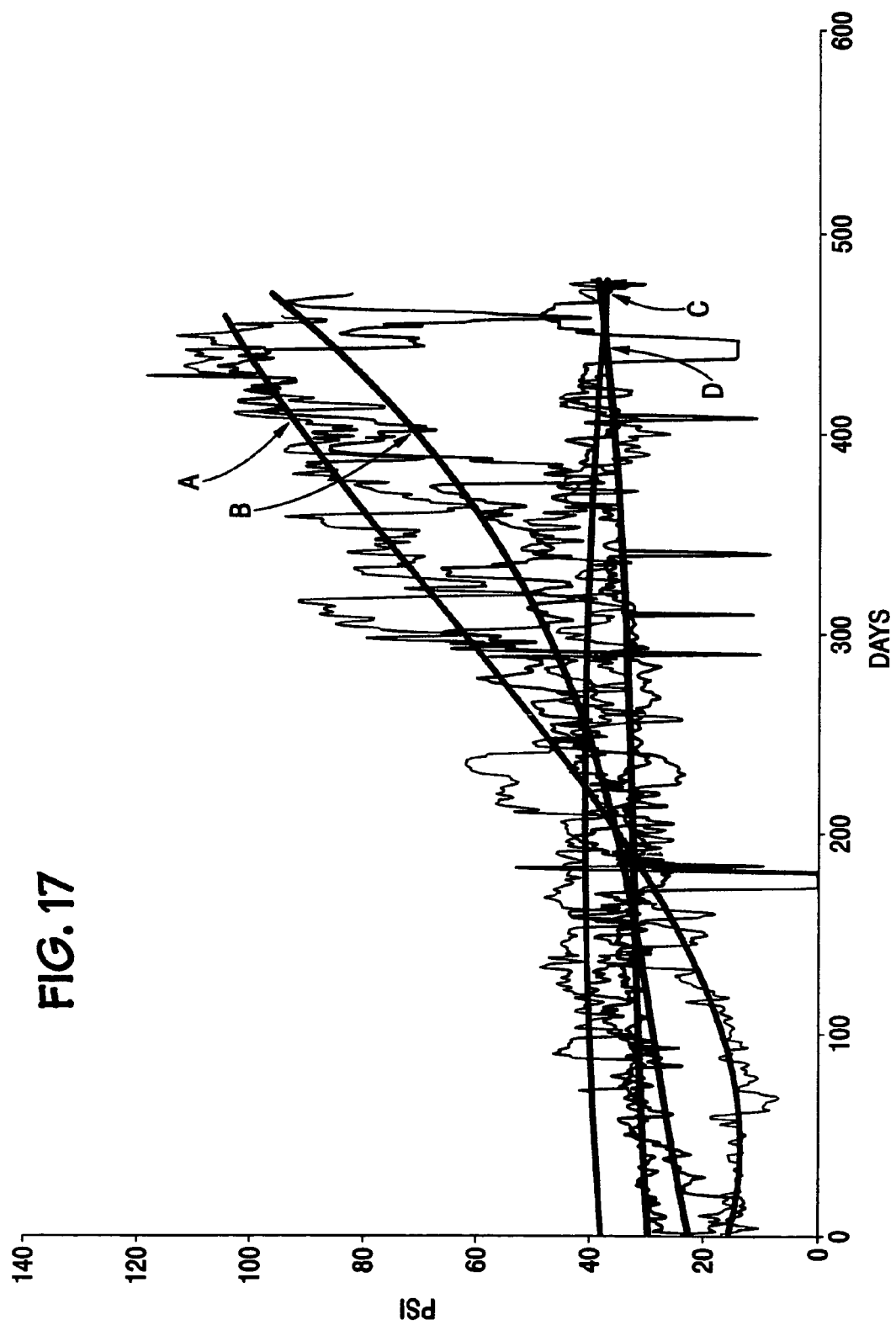
FIG. 17 is a graph comparing the pressure drop in distillate hydrotreaters with the reticulated elements of the present invention installed to the pressure drop in a distillate hydrotreaters with prior art, retention materials installed.

Data were obtained from a refinery for four distillate hydrotreaters in virtually identical process conditions. Two of the hydrotreaters, A and B, contained conventional reticulated materials, known as "ring grading systems." The remaining two hydrotreaters, C and D, used the reticulated elements of the present invention. FIG. 17 shows a comparison of the pressure drop of the four hydrotreaters using conventional ring grading systems and the reticulated elements of the present invention. As can be seen in the graph, the pressure drop remained low relative to start-of-run pressure drop over a period in excess of 450 days in the C and D hydrotreaters containing the reticulated elements, while the A and B hydrotreaters using the conventional ring grading system showed a dramatic pressure increase after only 200 days in service. The results of the pressure drop comparison can be seen in Table 1. The contaminated process streams in the distillate hydrotreaters were predominantly in a liquid phase. In the C hydrotreater, the differential pressure was only 8 psi at 450 days. In the D hydrotreater, the differential pressure was only 0.5 psi at 450 days. The differential pressure for the A and B hydrotreaters was 82.5 psi and 54 psi respectively. In comparison, the C and D hydrotreaters with the reticulated elements of the present invention performed significantly better than the conventional ring grading systems. The lower differential pressure associated with the reticulated elements of the present invention allows the time between turnarounds to be extended dramatically.

TABLE 1

Pressure Drop ("ΔP") in Example 1 - Distillate Hydrotreaters

| Hydrotreater | Initial ΔP at 0 day | ΔP at 200 days | ΔP at 450 days | % Change from 0 days to 450 days |
|---|---|---|---|---|
| A | 17.5 | 38 | 100 | 470% increase |
| B | 21 | 38 | 75 | 257% increase |
| C | 30 | 30 | 38 | 27% increase |
| D | 39 | 40.5 | 39.5 | 1.3% increase |

A typical pressure drop scenario is to have a low pressure drop for the first months of operation, but then, at a time that is not predictable, the pressure increases significantly over a relatively short period to a point where the unit must be shutdown to remove the pluggage, replace the removed material and restart the unit. This can be problematic given the unpredictability of the event, the need to acquire replacement materials with very short lead-time or to maintain sufficient extra inventory of replacement materials or to extend the down-time to await delivery of replacement materials. With use of the reticulated elements in accordance with the methods described herein, the pressure drop remains low for a predictable period of time based on the level of contaminants in the process stream and the capacity of the reticulated elements loaded in the process unit. Sufficient reticulated elements may be loaded such that the catalyst in the unit is exhausted before the reticulated elements are saturated.

EXAMPLE 2

Use in a Naphtha Hydrotreater

Data was obtained from a refinery with four naphtha hydrotreaters. Three of the hydrotreaters (A, B, and C) used conventional ring grading systems, while the remaining hydrotreater (D) used the reticulated elements of the present invention. FIG. 18 illustrates that comparative pressure drop between the four hydrotreaters. At the end of 200 days, the unit with the reticulated elements D experienced minimal pressure drop, i.e. –4 psi for hydrotreater D, compared to the pressure drop experienced by the three units containing ring grading systems, i.e. 10 psi for hydrotreater B and 22 psi for hydrotreater C. The contaminated process streams in the naphtha hydrotreaters were predominantly in a vapor phase. The reticulated elements of the present invention filtered efficiently and effectively while the conventional ring grading systems became clogged.

Referring again to FIG. 1, unless otherwise noted, in addition to filtering the contaminated process stream 20, the reticulated material 15 may also enable a uniform distribution and flow of the incoming process stream 20 to the catalyst bed 32.

By passing the process stream through a plurality of flow passageways 120 (FIG. 9) defined by web members 123 (FIG. 9) of the reticulated material 15 in layers 26, 28, the incoming process stream 20 may also be distributed by subdividing the incoming process stream into a plurality of smaller fluid streams and then resubdividing, a plurality of times, the smaller streams so that the incoming process stream is spread uniformly across the fluid entry cross-section 34, taken along line 34-34, of the catalyst bed 32. The process stream 20 is reacted in the catalyst bed 32. Preferably the catalyst bed 32 contains discrete solid catalyst particles 36.

For catalytic bed process units, methods of the present invention filter particulate contaminants before they reach the catalytic bed. This allows for increased efficiency of the catalyst bed since more of the surface area of the catalyst is available for use as a catalyst when compared to systems with conventional retention materials, such as the ring grading systems used in Examples 1 and 2. As a result, smaller sized, more catalytically active catalyst elements can be used due to the lower average pressure drop of the unit resulting in a gain in catalyst activity of about 10%-15%.

The reticulated material 15 may be used to filter and retain particulates 36 from the outgoing process stream 38. Small particulate material 36 that may be entrained in the outlet process stream may be filtered, or captured, from the process stream 38 and retained by reticulated material layers 40, 42. Preferably, the size of the reticulated material in layers 40, 42 is graduated from a size in layer 40 to another size in layer 42 at the outlet 44 of the reactor 22. In addition, sediments of material may form in the process unit, e.g., sediments formed by excessive hydrocracking of residual oils that may plug or foul downstream equipment. These sediments may be filtered from the outgoing process stream 38 by the reticulated material 15. Preferably, the size of the reticulated material in layers 40, 42 is graduated from a size in layer 40 to another size in layer 42 at the outlet 44 of the reactor 22. Alternately, the invention may also be used in an up flow configuration wherein the contaminated process stream 46 would instead enter the unit at 44 at the lower end 39 and the outlet process stream 25 would exit the process unit at 24 at the upper end 47 of reactor 22.

As previously discussed, another advantage of the present invention is to react activated or partially activated reticulated material 15 with polymer precursors in a contaminated process stream 20. Condensation polymerization of diolefins may occur in the process unit 32 after the contaminated process stream 20 is heated, generally prior to introduction into the process unit 22, thereby forming foulants in the process unit 32 itself that may gum or plug the process unit 32. As the foulants form in the process unit, they cannot be filtered from the contaminated process stream 20 before flowing across the fluid entry cross-section 34. Therefore, the layer or layers 26, 28, 40, 42 of reticulated material 15 may be coated with an alumina powder that may also act as a substrate for catalyst materials to form partially activated reticulated material. As used herein, an "activated support" means (1) a reticulated material that has been impregnated with catalyst materials or (2) a reticulated material that may be an oxide, nitride, or carbide of a metal or (3) a reticulated material that contains zeolite or inorganic oxides, e.g., alumina, silica, silica-alumina, magnesia, silica-magnesia or titania. As used herein, a "partially activated support" means an activated support material that has been purposefully made less active or partially deactivated in order to achieve a slower reaction rate or to partially react the materials contacted.

With regard to contaminated process streams, coated reticulated material 15 may also be used, wherein the coating may comprise one of several conventional catalysts. Alumina may be used as an active coating, optionally but preferably, alumina may be used as a support to strengthen the catalyst. The catalyst according to this invention preferably comprises a metal of Group VI-B or a member of Group VIII, or both, impregnated into an alumina based support. Accordingly, the catalyst may comprise at least one of chromium, molybdenum and tungsten in combination with at least one of iron, nickel, cobalt, platinum, palladium and iridium. The use of palladium is particularly useful in the removal of acetylene and diolefins from ethylene, the removal of oxygen, the removal of hydrogen. Of the Group VI-B metals, molybdenum is most preferred. The catalyst preferably will contain from about 2% to about 14% by weight of Group VI-B metal. Of the Group VIII metals, nickel and cobalt are most preferred. The amount of Group VIII metal in the catalyst is preferably from about 0.5% to about 10% by weight.

Figure 2:
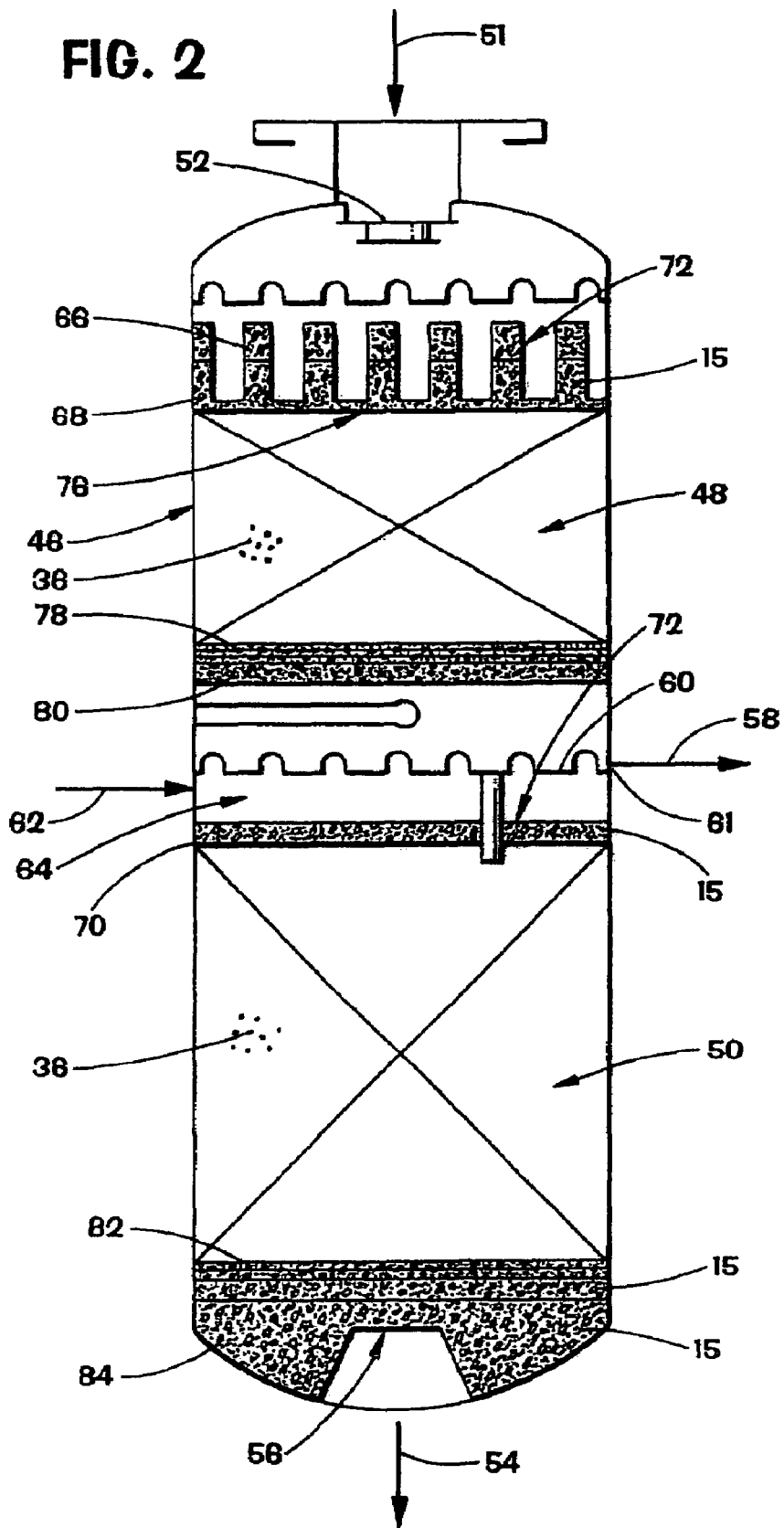
FIG. 2 is a partial cross-sectional side view of a multiple fixed bed chemical reactor showing another embodiment of the present invention.

With reference to FIG. 2, a multiple fixed catalyst bed process unit 46 having two fixed catalyst beds 48, 50 with reticulated material 15 in the shape of saddles 126 (FIG. 7) will be described. The reactor 46 is illustrated in a down flow configuration, wherein the contaminated process stream 51 will enter the unit 46 at the inlet 52 and the outlet process stream 54 will exit the unit at the outlets 56, 60. A partially reacted process stream 58 may be accumulated at the outlet 61 of the first fixed bed 48 and withdrawn at the collector tray 60. The partially reacted process stream 58 may be heated or quenched or otherwise treated before reintroduction into the reactor 46 as a partially reacted process stream 62 at the mixing chamber 64. The partially reacted process stream 58 may be removed for redistribution, heating, or other processing steps as required before reintroducing the partially reacted process stream 62 into the reactor 46 for reaction with a succeeding catalyst bed 50. An additional layer 70 of reticulated material 15 may be provided for filtration and distribution to remove any contaminants entrained from or formed by the processing equipment used in the additional processing steps such as dirt, iron oxide, iron sulfide, asphaltenes, coke fines, soot, catalyst fines, sediments or other entrained foreign particulate matter, salts in distillation columns, particulates in gas streams, sulfur or sulfides from tail gas units, or polymer precursors such as diolefins.

Layers 66, 68, 70 of reticulated material 15 are provided in the reactor 46 below the inlet 52 and mixing chamber 64 in an amount sufficient to filter the process stream 51 and the partially reacted process stream 62. Preferably, the multiple layers 66, 68, 70 are provided such that the porosity of the reticulated material 15 is graduated from a porosity in layer 66 to another porosity in layer 68 to another porosity in layer 70 as the incoming contaminated process stream flows through the reticulated material 15. Optionally, the present invention may be practiced with or without conventional basket screens 72. Preferably, the fixed catalyst beds 48, 50 contain discrete solid catalyst particles 74.

Figure 22:
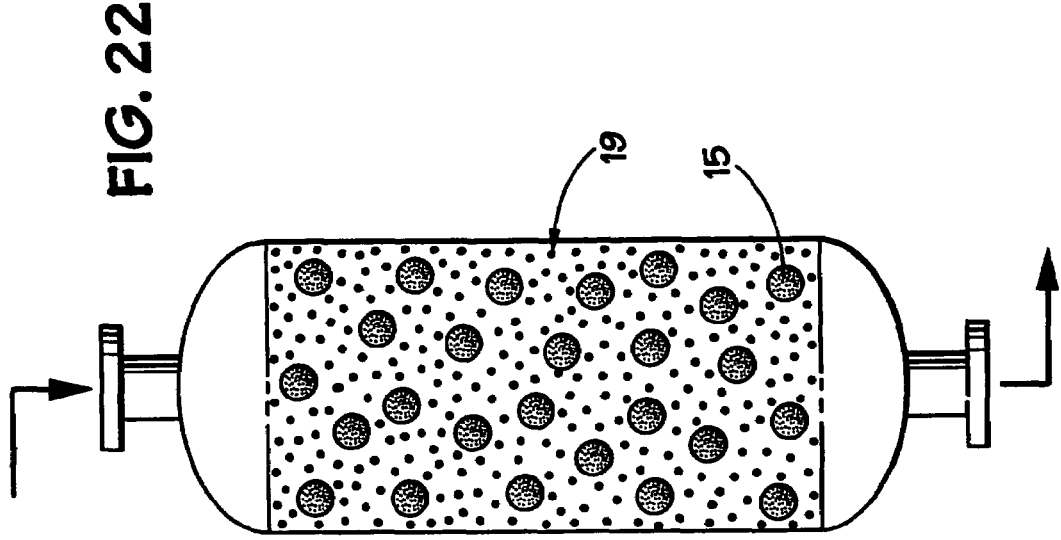
FIG. 22 is a perspective view of a process unit with the reticulated elements of the present invention randomly packed throughout an entire length of a catalyst bed according to an embodiment of the present invention.

Another feature of the present invention advantageously provides providing a plurality of reticulated elements 15 over an entire length of a process unit. The plurality of reticulated elements 15 can be commingled throughout the process unit with a catalyst 19, as shown in FIG. 22.

As previously discussed, an advantage of the present invention is that it may also be used to distribute the process stream. The process stream 51 may also be distributed while being filtered by subdividing the incoming process stream into a plurality of smaller fluid streams by passing the process stream through a plurality of flow passageways 120 (FIG. 9) defined by the web members 123 (FIG. 9) of the reticulated material 15; then resubdividing, a plurality of times, the smaller streams so that the incoming process stream is spread uniformly across the fluid entry cross-section of the catalyst bed 76. The feed 51 is then reacted in the catalyst bed 48, before being withdrawn as a partially reacted process stream 58 at the collector plate 60. The method of filtration and distribution is then repeated for the partially reacted process stream 62 as it flows into the mixing chamber 64 and passes through the reticulated material layer 70.

Another feature of the present invention is that the reticulated material 15 may also be used to capture and retain catalyst particles 74 from the outflowing partially reacted process stream 58 and the reacted process stream 54. The reticulated material 126 in layers 78, 80 at the outlet 61 of the first fixed bed 48 and the reticulated material 126 in layers 82, 84 at the outlet 56 of the second fixed bed 50 are used to filter and retain catalyst particles 74 that may be entrained in the partially reacted process stream 58 or reacted process stream 54. As discussed with reference to FIG. 1, for capturing and retaining catalyst 74 from a partially reacted or a reacted outflowing process stream in either a single or a multiple fixed bed chemical reactor, the reticulated material 15 is preferably graduated from a porosity to another porosity as shown in FIG. 2 for layers 78, 80 and 82, 84, respectively for each bed 48, 50. Optionally, the porosity of the reticulated material may also be graduated from small pores to large pores. Alternatively, the porosity of the reticulated material may be inversely graduated from large pores to small pores to filter sediments that may form in the catalyst bed.

A further advantage of the present invention is that the reticulated material 15 may be activated or impregnated with catalytically active material to react with polymer precursors in process streams 51, 62. As depicted in FIG. 2, layers 66, 68, 70 of reticulated material 15 may contain an activated support including inorganic oxides preferably selected from the group consisting of alumina, silica, silica-alumina, magnesia, silica-magnesia or titania or zeolites preferably selected from the group consisting of zeolite L, zeolite X, and zeolite Y, which may be added to the reticulated material as a substrate for catalyst materials. Optionally, the reticulated material may be impregnated with catalyst materials or the reticulated material may be an oxide, nitride, carbide or boride of a metal as disclosed in U.S. Pat. No. 5,399,535, which is hereby incorporated by reference to the extent it is not inconsistent with the present invention.

Activated or partially activated reticulated material as described above may be used to control the hydrogenation rate of the diolefins or other polymer precursors to prevent fouling or gum formation. When endothermic reactions require the addition of heat to the partially reacted process stream 58, preferably the reticulated material 15 of layer 70 is also activated or partially activated. The invention may also be practiced with coated reticulated material, wherein the coating may comprise one of several conventional catalysts. Alumina may be used on an active coating or support. The catalyst according to this invention preferably comprises a metal of Group VI-B or a member of Group VIII, or both, impregnated into the reticulated material, inorganic oxide or zeolite. Accordingly, the catalyst may comprise at least one of chromium, molybdenum and tungsten in combination with at least one of iron, nickel, cobalt, platinum, palladium and iridium. Of the Group VI-B metals, molybdenum is most preferred. The catalyst preferably will contain from about 2% to about 14% by weight of Group VI-B metal. Of the Group VIII metals, nickel and cobalt are most preferred. The amount of Group VIII metal in the catalyst is preferably from about 0.5% to about 10% by weight.

Figure 3:
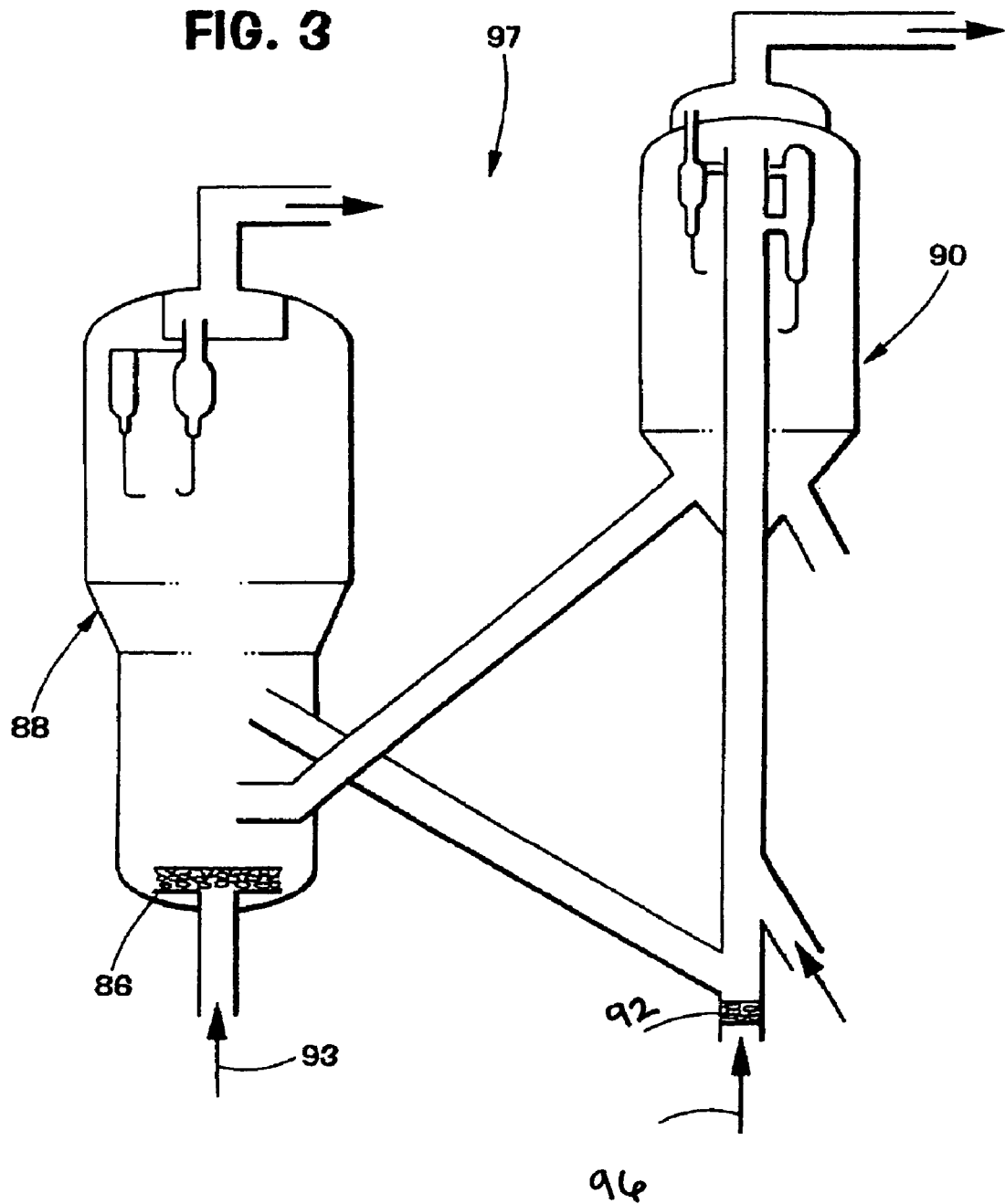
FIG. 3 is a partial cross-sectional side view of a combustor-style regenerator fluidized bed reactor showing an embodiment of the present invention.
Figure 10:
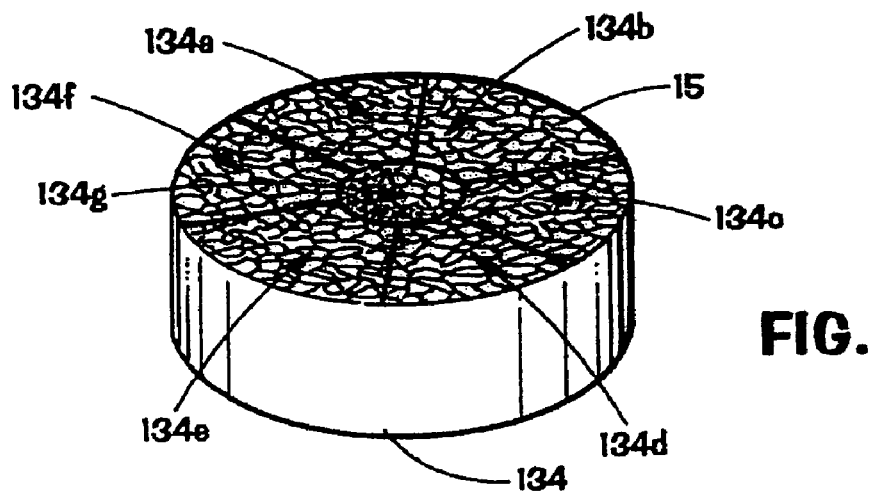
FIG. 10 is a perspective view of an assembled disk made of reticulated material in accordance with the present invention.

FIG. 3 illustrates a conventional combustor-style fluidized bed reactor 88, 90. Layers 86, 92 of reticulated material 15 may be used in fluidized bed chemical reactors 90 and in a combustor, or regenerator 88, to reduce entrance losses and maldistribution of the vapor or air flows. The inlet air 93 to the combustor or regenerator 88 is flowed through the reticulated material layer 86 to subdivide the stream into a plurality of smaller flowing streams. The reticulated material 15 may be a single circular disk 124 (FIG. 6) without the illustrated perforation 125; however it may be an oval or square sheet 121 (FIG. 9), or any geometric configuration desired including an assembled disk 134 (FIG. 10). Optionally, multiple disks 86, 92 (FIG. 3) may be used. Also, the disk 124 (FIG. 7) or sheet 121 (FIG. 9) may optionally contain perforations. The subdivision of the vapor or air flows may reduce the turbulence of the incoming vapor or air streams, thus reducing the compressor horsepower usage or allowing for an increase in flow rate, depending on the process constraints of the particular combustor-style fluidized bed reactor (FIG. 3). A further advantage of the present invention is that the subdivided vapor or air flows may more uniformly distribute the vapor or air 94 throughout the combustor or regenerator 88. In addition, another layer 92 of reticulated material 15 may be used to uniformly distribute any fluffing vapors 96 used in the fluidized bed reactor 90.

Figure 4:
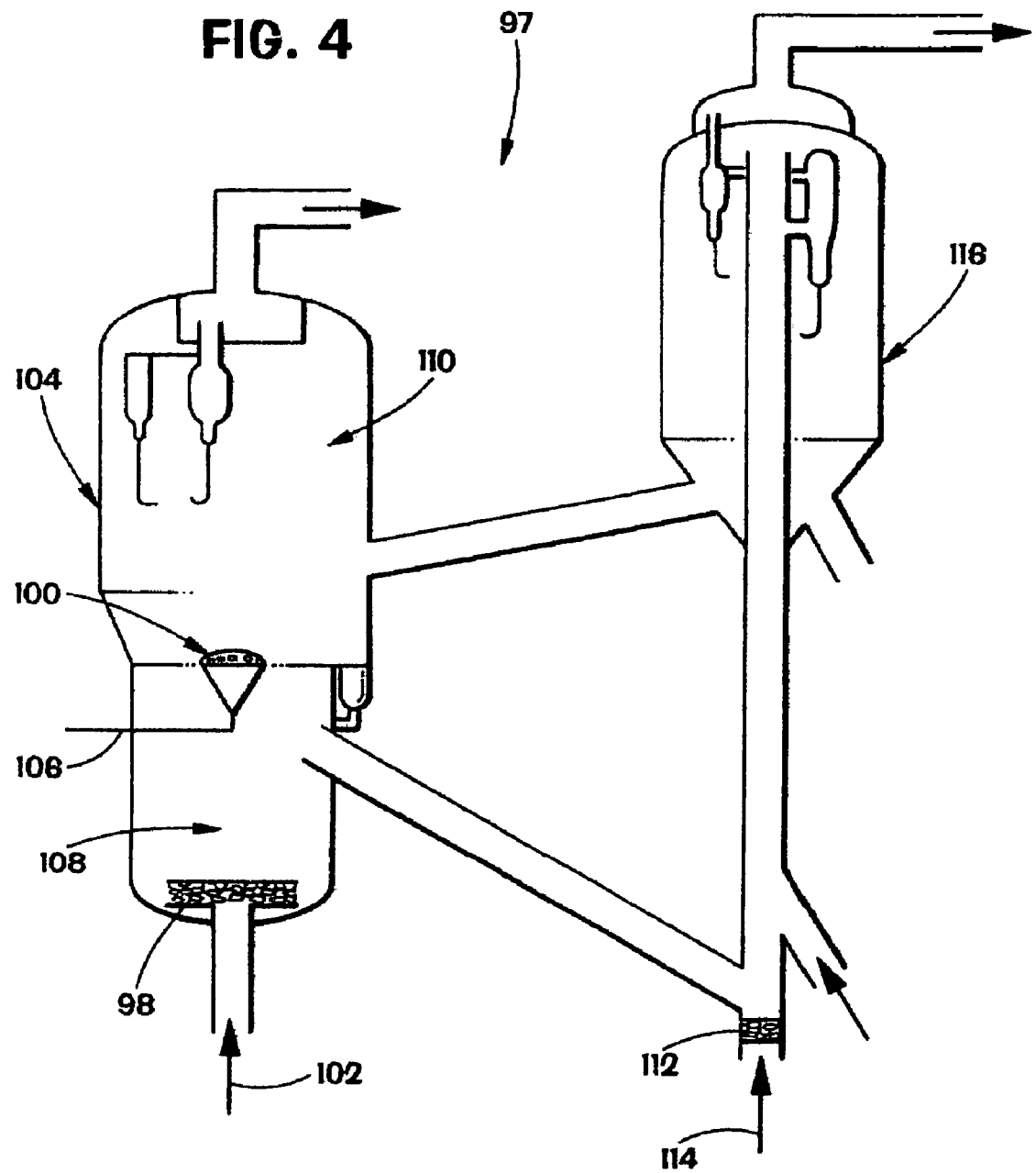
FIG. 4 is a partial cross-sectional side view of a two-stage regenerator fluidized bed reactor showing an embodiment of the present invention.

Alternatively, in FIG. 4, which depicts a conventional two-stage regenerator fluidized bed reactor 104, layers 98, 112 of the reticulated material 15 may be used similarly as discussed in FIG. 3 for a single-stage combustor or regenerator. The turbulent inlet air 102 to the combustor or regenerator first stage 108 is flowed through the layer 98 of reticulated material 15 to subdivide the stream, preferably into a plurality of smaller flowing streams. Preferably, the reticulated material 15 is a single circular disk 124 (FIG. 6) without the perforations 125; however it may be an oval or square sheet 121 (FIG. 9), or any geometric configuration desired including an assembled disk 134 (FIG. 10). Optionally, multiple disks 98,112 (FIG. 4) may be used. Also, the disk 124 (FIG. 7) or sheet 121 (FIG. 9) may optionally contain perforations. Similarly, for the second-stage 110, the turbulent inlet air 106 may be flowed through the layer 100 of reticulated material 15 to subdivide the stream into a plurality of smaller flowing streams. The subdivision of the vapor or air flows may reduce the turbulence of the incoming vapor or air streams, thus reducing the compressor horsepower usage or allowing for an increase in flow rate, depending on the process constraints of the two-stage regenerator fluidized bed reactor 104, 116. A further advantage of the present invention is that the subdivided vapor or air flows may more uniformly distribute the vapor or air throughout the combustor or regenerator chambers 108, 110. In addition, another layer of reticulated elements 112 may be used to uniformly distribute any fluffing vapors 114 used in the fluidized bed reactor 116.

Figure 5:
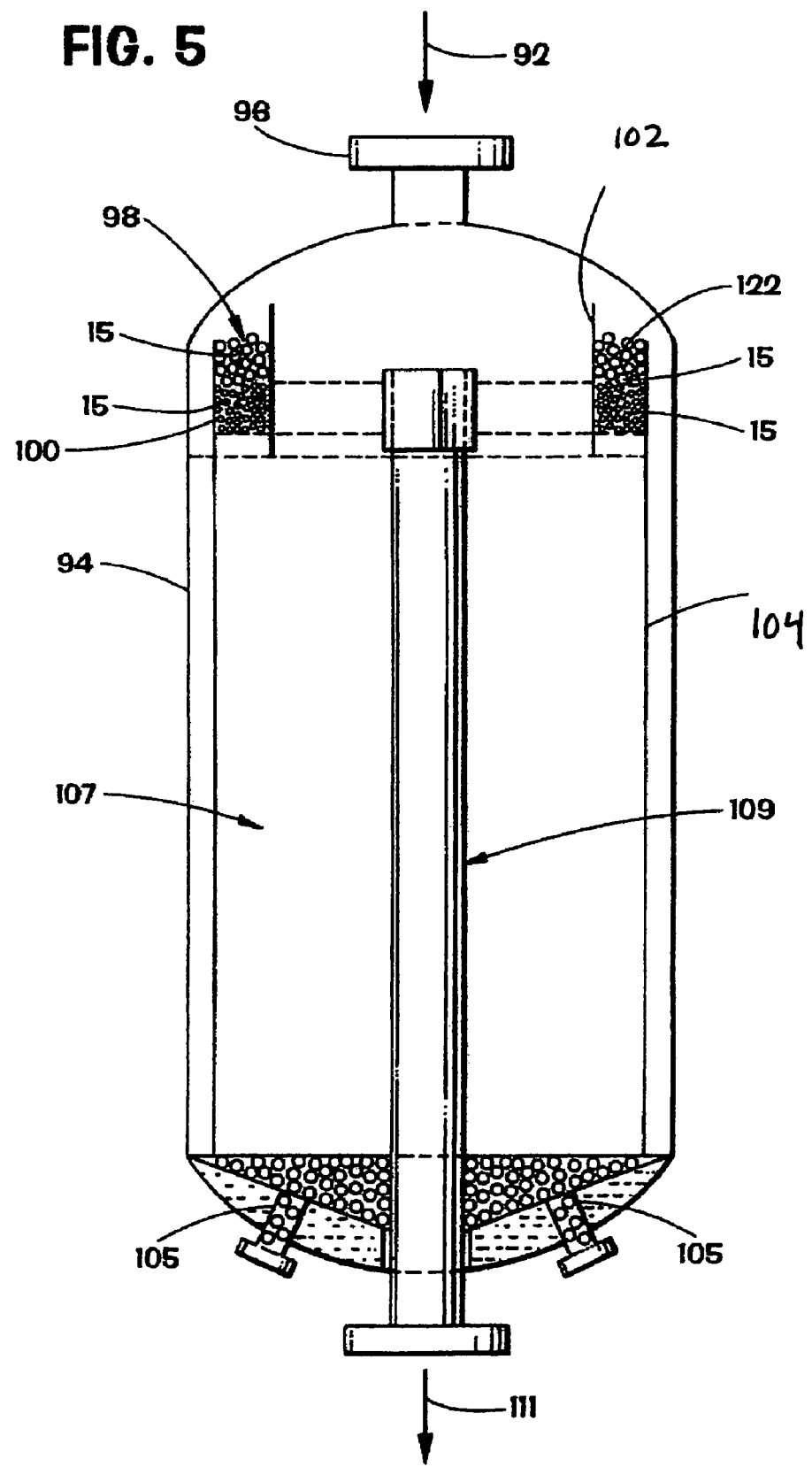
FIG. 5 is a partial cross-sectional side view of a radial flow reactor showing another embodiment of the present invention.

With reference to FIG. 5, for treatment of a contaminated process stream in vapor form, a radial flow fixed bed chemical reactor 94 with reticulated material 15 in the shape of substantially spherical balls 122 (FIG. 11) is illustrated, although, as previously discussed, other shapes may be used. The contaminated process stream in vapor form 92 will enter the radial flow reactor 94 at the inlet 96. A layer 98 of reticulated material 15, more preferably layers 98, 100 of reticulated material 15, is provided in the vessel between the deflection baffle 122 and the scallop 104. The layers of 98, 100 reticulated material 15 aid in filtering contaminants such as dirt, iron oxide, iron sulfide, asphaltenes, coke fines, soot, catalyst fines, sediments or other entrained foreign particulate matter, or polymer precursors such as diolefins entrained in the contaminated vapor feed 92 before reaction in the fixed catalyst bed 108 and discharge through the center pipe 110 as the reacted process stream 112. Also as previously discussed, an advantage of the present invention is that the reticulated material 15 may be used to capture and retain catalyst from outlet streams, shown here in the unloading tubes 106.

The reticulated elements can be used to filter contaminants, such as sediments, in other types of process equipment. FIG. 15 illustrates another embodiment of the present invention. In this embodiment, reticulated elements 95 are used for removing sediments, such as salts, in a distillation column 90. The method of filtering sediments formed in process equipment preferably includes providing a layer of reticulated elements packed with a void space between each reticulated element. The void space is varied to enhance filtration of smaller contaminants on a surface of the reticulated elements while allowing larger contaminants to pass through to prevent pluggage of the layer of reticulated elements. The method further provides for contacting a process stream containing the sediments with the reticulated elements thereby removing the sediments from the process stream by removing the smaller contaminants on the surface of the reticulated elements and allowing the larger contaminants to proceed through the void spaces between each reticulated element. This method produces a relatively sediment-free process stream for further processing.

Figure 12:
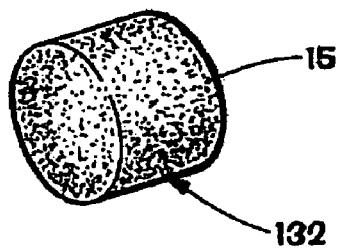
FIG. 12 is a perspective view of a solid cylinder made of reticulated material in accordance with the present invention.
Figure 13:
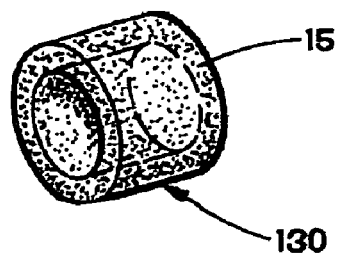
FIG. 13 is a perspective view of a hollow cylinder made of reticulated material in accordance with the present invention.

FIG. 6 illustrates a specific embodiment of the present invention as a reticulated elements disk 124. Optionally, the disks may have perforations 125. Preferably, multiple perforations are used to accommodate screen baskets that may optionally be filled with reticulated elements. Other shapes may include saddles 126 (FIG. 7), hollow cylinders 128 (FIG. 8), single sheets 121 of reticulated material 15 (FIG. 9), disks 134 formed from a plurality of segments 134 *a-f* (FIG. 10), substantially spherical balls 122 (FIG. 11), solid cylinders 132 (FIG. 12), raschig rings 130 (FIG. 13), squares (FIG. 14), and monoliths (FIG. 14). Each shape may be sized to individual specifications. Sizes for the shapes used may include substantially spherical balls of about ⅛ to 2 inch diameters; raschig rings with inside diameters of about ⅛ to 1 inch and outside diameters of about ¼ to 1½ inches and heights of about ¼ to 2 inches; saddle shapes with radii of about ¼ to 2 inches; hollow cylinders having inside diameters of about ⅛ to 1¼ inches, outside diameters of about ¼ to 2 inches, and heights of about ¼ to 3 inches; and solid cylinders having diameters of about ⅛ to 1 inch and heights of about ¼ to 2 inches. Custom-made one-piece disks 124 or single sheet 121 construction may be custom-fit to the physical configuration of a reactor. A further feature of this aspect of the present invention is that the reticulated material 15 may be formed in either a disk 124 or single sheet 121 having perforations 125. An additional feature of the present invention is that the reticulated elements when constructed may be formed into a plurality of segments in order to form an assembled sheet or disk that is custom-fit to the reactor's physical configuration. Porosities of the reticulated elements may range from 4 to 800 ppi. Preferably, for filtration the porosity may range from about 4 to 80 ppi. More preferably, for filtration the porosity may range from about 10 to 65 ppi. This enables customization of the size and shape of the reticulated material 15 for the application, size, particulate loading and pressure drop constraints. The reticulate element material surrounding the pores, or openings, of the reticulated elements form the web members 123 (FIG. 9), which in turn define the flow passageways 120 (FIG. 9).

The present invention also advantageously provides a method of perpendicular flow distribution in process units. This perpendicular flow distribution method includes providing one or more reticulated elements in the process unit. When only one reticulated element is used, it is typically large enough to effectively span the process unit. When multiple reticulated elements are used, they are typically arranged in a randomly packed bed. Regardless of the configuration of the reticulated elements, each reticulated element has a plurality of web members that define a plurality of flow passageways through the reticulated element. A process stream contacted with the plurality of reticulated elements is therefore subdivided into a plurality of smaller fluid streams by passing the process stream through the plurality of flow passageways defined by the web members of each reticulated element. The flows of the process stream through the flow passageways within the reticulated elements and through the void spaces between the reticulated elements when multiple reticulated elements are used provides for effective flow distribution perpendicular to the flow of the process stream through the process unit. This method can be applied to process streams that are entering the process unit, at any location within the process unit, at the exit from the process unit or any combination of these locations, as illustrated in FIG. 19. This method can be applied to process streams while concurrently providing for filtration of contaminants from the process stream. This method can be applied to process streams while concurrently performing catalytic reactions to partially or totally remove or convert desired chemical species in the process stream.

FIG. 21 illustrates the amount of perpendicular flow that the reticulated elements of the present invention are capable of producing. An experiment was performed using a dropper with a dropper diameter of approximately 1/16". The reticulated element distributed the liquid perpendicularly to a diameter of about seven times the diameter of the dropper. The flow was not distributed down the reticulated element as much. The significant distribution was made in the horizontal plane and not a vertical plane. When used in process units, the reticulated elements significantly perpendicularly disperses the fluid to prevent channeling and other problems discussed herein.

Figure 20:
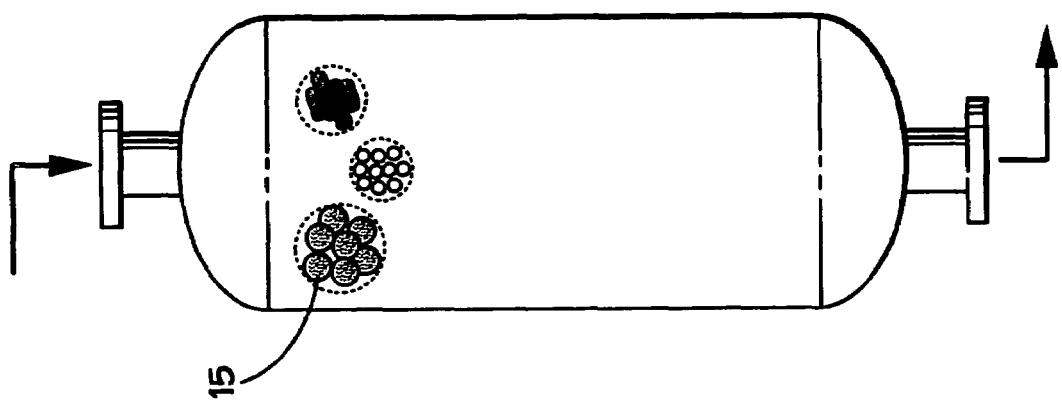
FIG. 20 is a partial cross-sectional view of a process unit with layers of reticulated elements of differing porosities to enable filtering of contaminants with a wide range of particle sizes in accordance with an embodiment of the present invention.

An additional feature of the present invention can include the step of using reticulated elements in a variety of porosities and pore sizes, as shown in FIG. 20. The reticulated elements can be manufactured such that they have a porosity of so many pores per inch ("ppi"). For example, this means that a reticulated element of 30 ppi will, when examined by one skilled in the art, have on average 30 pores per inch. The pore sizes of such a material would be about one millimeter. Pore size in this context is the general size of the cavity of the pore recognizing that pores are not perfect spheres. Another important element of pore size is the size of the window opening into the pore. It is this measure that determines the size of the largest particle that can be trapped or filtered within the pore. The porosity range of the reticulated elements of the present invention is from about 4 to 800 ppi. This enables customization of the size and shape of the reticulated elements for the application constraints including particulate loading and pressure drop constraints. The pores of the reticulated elements can be in a range of about 6 millimeters to about 100 microns, each being defined by a plurality of web members forming a plurality of flow passageways through the reticulated elements.

As an advantage of the present invention, the filtering method provides for more efficient filtration within the process unit. Since the contaminants do not cake up on the first inches of the reticulated elements, as with conventional retention materials, all of the filter bed can be effectively used. Pressure drop through the reticulated elements can remain low as long as sufficient reticulated elements are utilized such that the process unit reaches an end-of-run condition other than pressure drop increase. The lower pressure drop increases the safety of operating the unit since downstream equipment is not deprived of flow and the upstream equipment does not pressure up. The run times between catalyst changes are significantly increased since the process equipment can operate much longer than with previous filtration methods before the process equipment end-of-run conditions.

Another advantage of the present invention is that smaller sized catalysts can be used in catalyst bed process units since the catalyst bed is subjected to a much lower cycle-average pressure drop. The result of using the smaller, more catalytically reactive catalyst is a gain in activity of about 10% to about 15%. The entire surface area of the catalyst can be used for its intended purpose, which is to modify and increase the rate of a reaction, due to a much lower average pressure drop per cycle for the process unit.

Another advantage of the present invention is, as depicted in FIG. 21, the use of one or more layers of reticulated elements at various locations within a process unit to facilitate perpendicular flow redistribution to mitigate channeling and other symptoms of flow maldistribution. Such one or more layers of reticulated elements within a process unit also facilitate filtration of particulate contaminants within the process unit.

Figure 23:
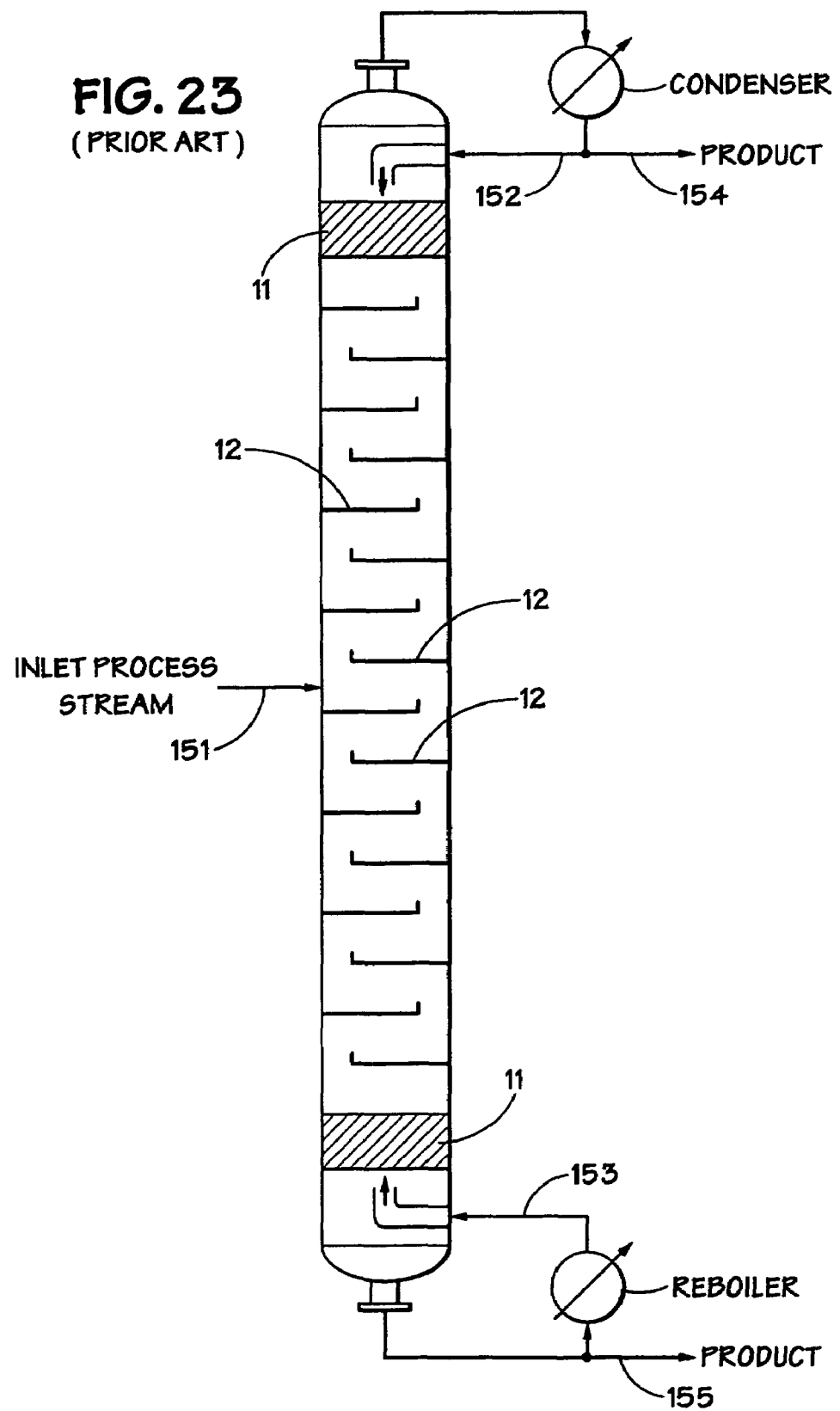
FIG. 23 is a partial cross-sectional side view of a conventional component separation unit in accordance with the prior art.

With reference to FIG. 23, shown is a prior art distillation column with conventional trays 12 and two conventional distributors 11, one located near the top and one near the bottom of the unit. Process streams entering the unit include the inlet process stream 151, a portion of the overhead liquid stream 152 exiting the condenser and the vapor stream 153 exiting the bottoms reboiler. Component process streams are recovered as a portion of the liquid stream 154 exiting the condenser and a portion of the liquid stream 155 exiting the bottom of the unit.

Figure 24:
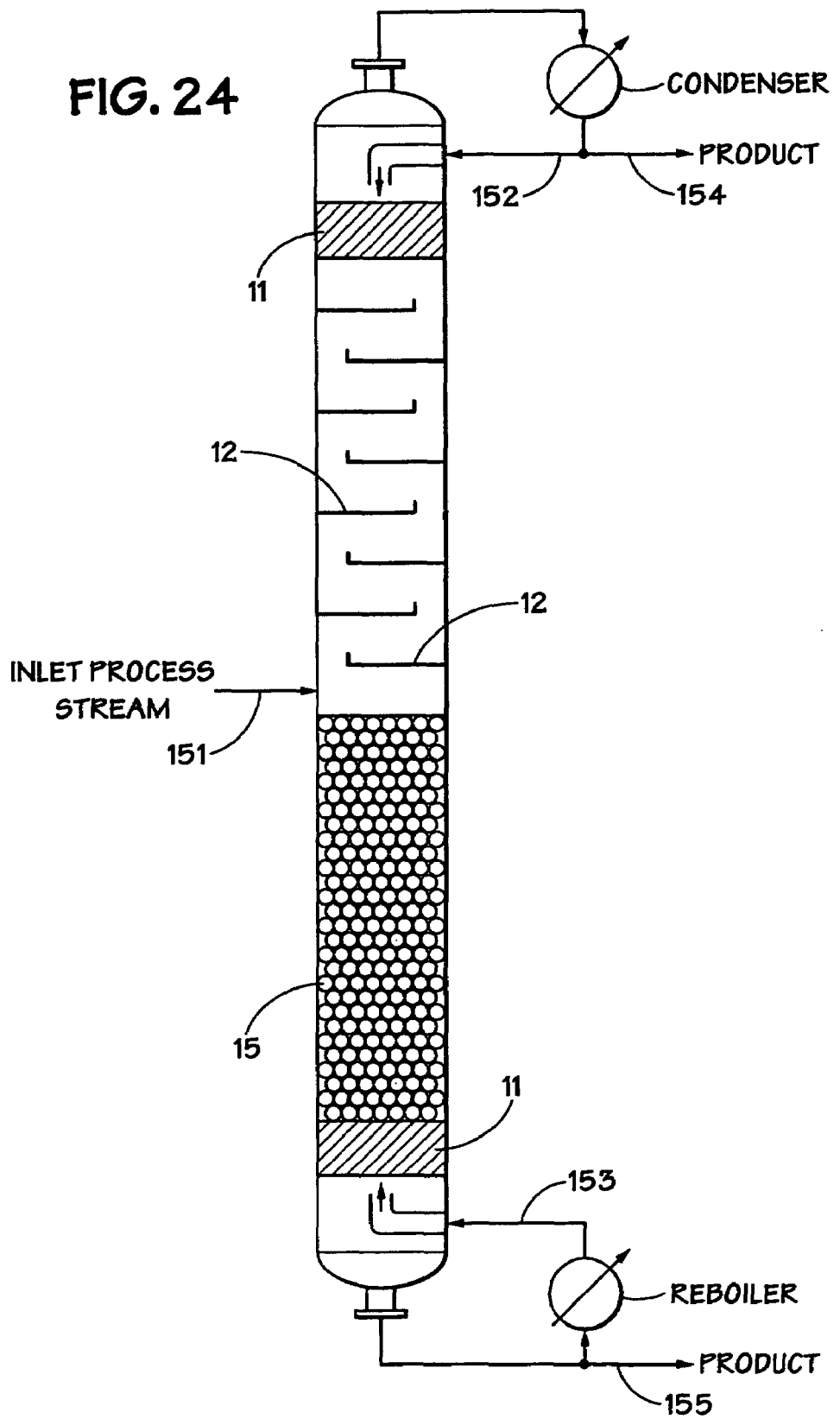
FIG. 24 is a partial cross-sectional side view of a component separation unit containing CELLDIST material, conventional trays and conventional distributors according to the present invention.

Referring to FIG. 24, a method and assembly for utilizing CELLDIST material 15 within a component separation unit to separate process streams will be described. In this embodiment, CELLDIST material 15 is disposed within the unit to replace some of the conventional trays 12 in the unit. For example, large, bulky trays can be replaced with smaller, less complex trays, and the additional space that is created within the unit can be completely or partially filed with CELLDIST material 15 to achieve improved separation.

Figure 25:
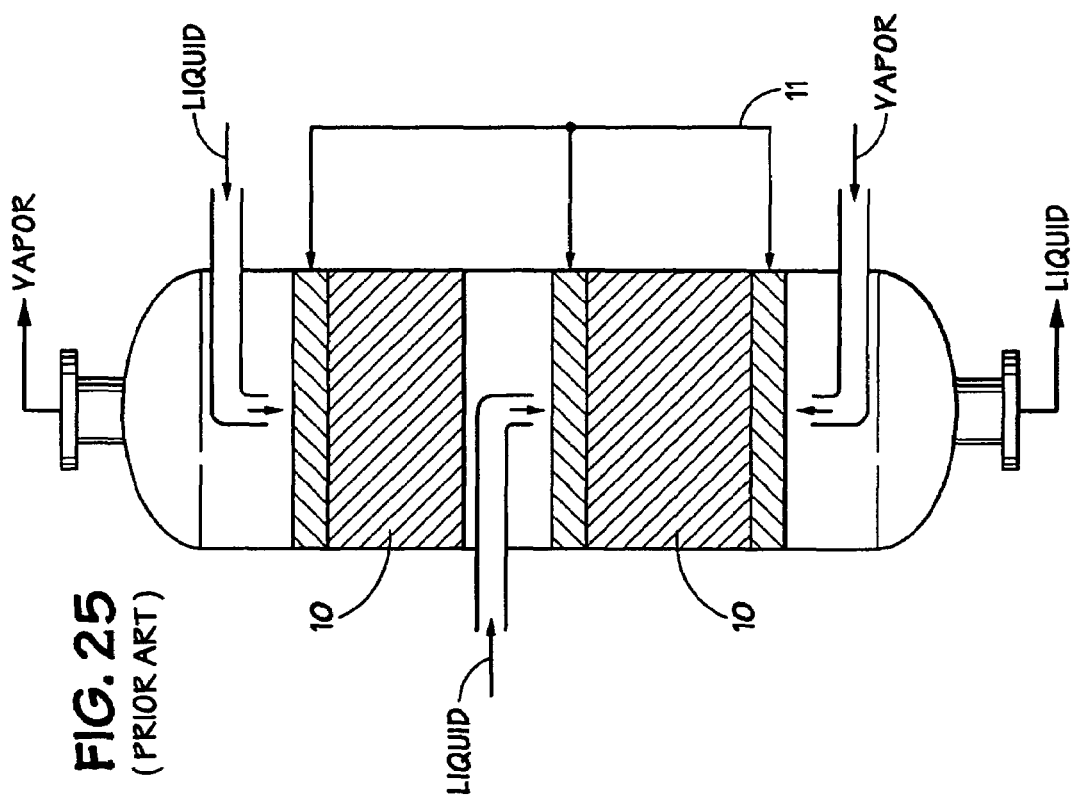
FIG. 25 is a partial cross-sectional side view of a component separation unit utilizing conventional packing material and conventional distributors to achieve separation of process streams into component process streams in accordance with the prior art.
Figure 26:
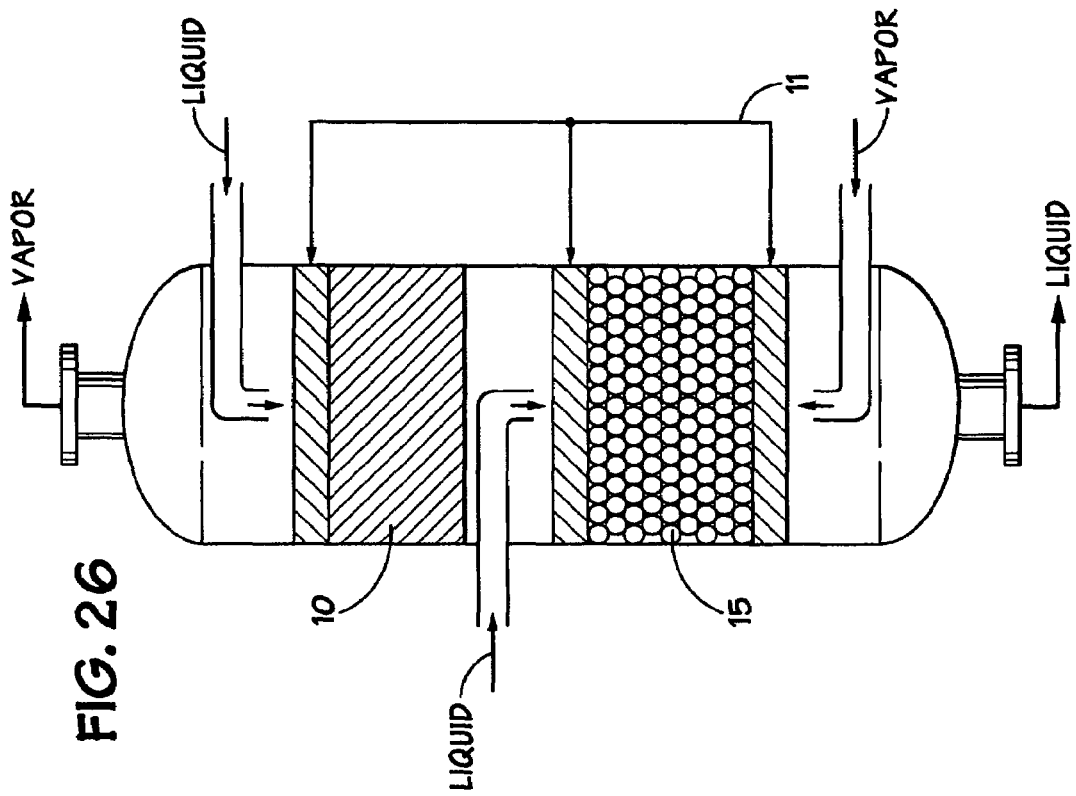
FIG. 26 is a partial cross-sectional side view of a component separation unit utilizing CELLDIST material, conventional packing material and conventional distributors to achieve separation of process streams into component process streams in accordance with an embodiment of the present invention.

FIG. 25 shows a component separation unit according to the prior art containing conventional packing material 10. FIG. 26 shows an embodiment of the present invention using CELLDIST material 15, conventional distributors 11 and conventional packing 10 within a component separation unit.

The CELLDIST material 15 may be composed of any material that is capable of being fabricated into the required structure, and able to withstand the temperature, pressure, corrosivity and other requirements of component separation unit operation. Inert CELLDIST material 15 can be used when no reactivity with the components in the process stream is desired. In another embodiment, the CELLDIST material 15 is composed of a non-metallic material in order to allow for treatment of corrosive systems such as hydrochloric or sulfuric acid, to decrease design cost, installation time and to reduce heat loss in the unit.

Figure 27:
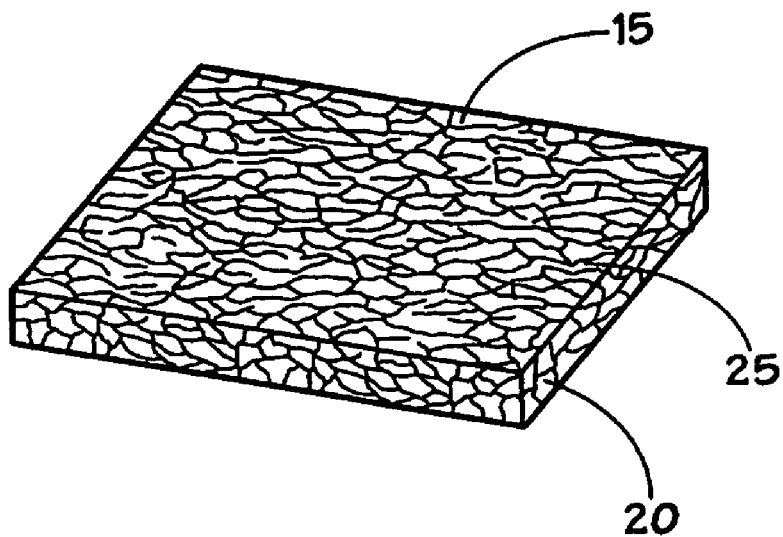
FIG. 27 is a perspective view of an example of a one-piece sheet made of CELLDIST material for use in a component separation unit in accordance with the present invention.
Figure 28:
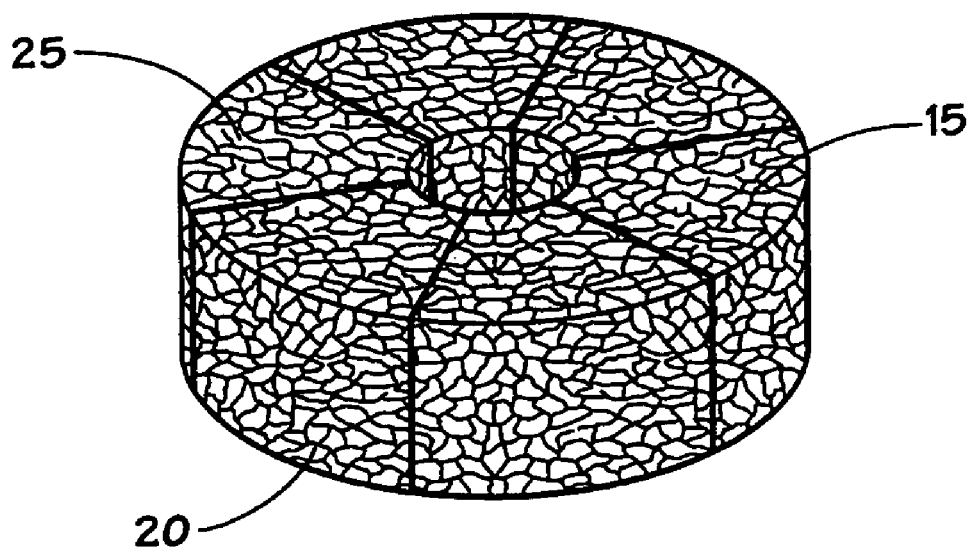
FIG. 28 is a perspective view of an assembled disk made of CELLDIST material for use in a component separation unit in accordance with the present invention.

The CELLDIST material 15 can take a variety of shapes with openly connected pores forming pathways or passageways 120 as illustrated in FIG. 27. The pathways in the CELLDIST material 15 allow the countercurrent flow of phases through the material. Such pathways facilitate mass transfer between the phases passing through the CELLDIST materials 15. The CELLDIST material 15 can be manufactured to exhibit a wide range of porosity. This enables customization of the porosity of the CELLDIST material 15 for the specific application. Also, this ensures that the CELLDIST material 15 has sufficient mass and porosity to provide the number of theoretical stages needed to achieve the desired separation of components in the unit. The CELLDIST material 15 has web members 123 surrounding the pores, or openings, which in turn define the boundaries of the flow passageways 120 (FIGS. 27 and 28).

Porosity of CELLDIST materials is measured in units of pores per inch ("ppi"). The porosity of porous materials is graduated as known to those skilled in the art. Microporous materials have the smallest pore sizes, generally from about five Angstroms to about five nanometers. Mesoporous materials generally have pore sizes of about five nanometers to about fifty nanometers. Macroporous materials have pore sizes in excess of about fifty nanometers. CELLDIST material comprised of macroporous pores or cells can have a random pattern as illustrated in FIG. 28. The porosity range of the CELLDIST material 15 of the present invention is from about 4 to about 800 ppi. In a preferred embodiment for use in a component separation unit, the CELLDIST material 15 of the present invention will have a porosity of about 4 to about 30 ppi. The surface area of the interconnected pores in the CELLDIST material 15 facilitates phase mixing and mass transfer within the unit. In one embodiment, the CELLDIST material 15 of the present invention advantageously provides an increased surface area when compared to packing materials and other unit internals used in the prior art. The surface area of the CELLDIST material of the present invention of up to 4000 square meters per cubic meter of CELLDIST material is in comparision to the approximately 60-750 square meters of surface area per cubic meter typically provided in prior art unit packing internals. This increased surface area advantageously provides a more expansive location upon which contacting of the phases can occur. The corresponding increased level of contact between the phases results in improved separation capacity in the unit. The increased level of contact between the phases also results in improved mass transfer efficiency and a lower HETP than prior art units.

In an embodiment of the present invention, phases are passed through one or more zones of CELLDIST material 15 positioned within the unit, as illustrated in FIGS. 24 and 26. The process streams entering the unit can be liquid streams, vapor streams, or a combination of both, and may include one or more of, for example, a feed stream, a reflux stream, a recycle stream, a reboiled stream, a pumparound stream, a pump-back reflux stream and a sidestream recycle stream. A process stream can also function as a mass-separating agent, as is the case in liquid-liquid extraction. Distillation using CELLDIST material 15 according to embodiments of the present invention can be accomplished at high gas or vapor loadings within a conventional unit.

In one embodiment, the CELLDIST material 15 is in the form of a single structured element, as illustrated in FIG. 27. The structured element can be shaped or sized to fit within the inner cross-section of the component separation unit. The element can be, for example, a disk, an oval, a rectangle or any geometric shape that is required in order for the material to fit within the cross section of the unit. Alternatively, if the unit has a relatively large cross-section, one or more smaller sections of CELLDIST material 10 can be fitted together, as illustrated in FIG. 28, to span the cross-section of the unit. The CELLDIST material 15 can form a single layer within the unit. Also, multiple layers of CELLDIST material 15 may be utilized within the unit. The CELLDIST material 15 can be laid in an offset pattern to decrease the likelihood of leakage or channeling within the zone of CELLDIST material in the unit. One or more CELLDIST materials 15 can also be positioned over an entire length of a unit. Also, multiple CELLDIST materials 15 can be commingled throughout the unit with one or more conventional unit internals, for example trays as shown in FIG. 24, packing material as shown in FIG. 26 or distributors, as shown in FIGS. 24 and 26.

There may be voidage, or open space, within the pores of, or surrounding the exterior of, the CELLDIST material 15 in the unit. Typically, a high voidage space or void fraction corresponds to a high porosity and a low pressure drop within the unit, which is desirable for separation purposes. The internal void fraction of the CELLDIST material 15 of the present invention is preferably as high as 70 percent. By comparison, the voidages found in most currently available metallic structured packings are about 98-99 percent, and are about 65 percent for nonmetallic structured packing. While certain of these prior art materials may have higher void fractions than that of the present invention, the increase in mass transfer efficiency associated with the increased surface area of the CELLDIST material 15 of the present invention can allow the unit to be operated at a lower flooding number. This will preferably result in the same, or better, productivity for a unit operated with CELLDIST material 15 according to the present invention than a unit utilizing the prior art materials with higher voidage percentages.

The CELLDIST material 15 also exhibits good wettability characteristics when compared to prior art packing materials. Wettability relates to the level of contacting and distribution of phases on the surface of the packing material and is affected by the structure of the material. A high wettability value is critical for avoiding maldistribution of phases within the unit.

In general, a packing material that achieves a high theoretical number of stages at a given flooding factor with a low pressure drop is an efficient and preferred packing material. The goal is to minimize the amount of packing material used and yet produce the number of theoretical stages that will result in the desired separation. The CELLDIST material 15 of the present invention advantageously exhibits high separation efficiency and low pressure drop characteristics when compared to prior art materials used in component separation units, which is a result of the increased surface area and preferred voidage and wettability characteristics of the CELLDIST material 15.

It is to be understood that the invention is not to be limited to the exact details of construction, operation, exact materials, or embodiments shown and described, as obvious modifications and equivalents will be apparent to one skilled in the art. For example, special liquid distributors or conventional liquid distributors could be used with the reticulated elements to facilitate the spreading of the liquid across process equipment. Conversely, the reticulated elements could be used only for particulate removal. Accordingly, the invention is therefore to be limited only by the scope of the appended claims.

What is claimed:

1. A method of separating at least one process stream into one or more component process streams having desired compositions in a component separation unit, the method comprising the steps of: (a) providing a stochastic three dimensional cellular solid material having a solid component and one or more cells in the unit; (b) positioning the cellular solid material within at least one zone of the unit; (c) introducing two or more phases of the at least one process stream into the zone containing the cellular solid material; (d) contacting the two or more phases at a surface of the cellular solid material to facilitate mass transfer; and (e) recovering at least a portion of one or more of the phases from the unit as at least one component process stream, wherein the at least one component process stream has a desired composition and wherein the cellular solid material has a pore size in the range of about 100 microns to about 6,000 microns.

2. The method of claim 1, wherein the cellular solid material has a plurality of cell sizes and shapes.

3. The method of claim 1, wherein the phases have desired compositions upon exiting the zone of cellular solid material.

4. The method of claim 1, wherein one or more component process streams are recovered from one or more locations on the unit.

5. The method of claim 1, wherein the surface of the cellular solid material has a surface area in the range of about 250 to about 4000 square meters per cubic meter of cellular solid material in the unit.

6. The method of claim 1, wherein the cellular solid material is selected from the group consisting of oxides, carbides, nitrides, borides, a ceramic material, a metallic material, a polymeric material and a chemical vapor deposition material.

7. The method of claim 1, wherein the cellular solid material is formed from a corrosion resistant material.

8. The method of claim 1, wherein the cellular solid material is predominantly formed from silicon carbide.

9. The method of claim 1, wherein the unit contains one or more conventional unit internals.

10. The method of claim 1, wherein the cellular solid material has a porosity of about 4 to about 30 pores per inch.

11. The method of claim 1, wherein: (a) a first process stream containing components A and B is introduced into the unit at a first location; (b) a second process stream containing component C is introduced into the unit at a second location; and (c) the first and second process streams are intimately contacted at the surface of the cellular solid material to produce a first component process stream containing component A with essentially no component B and a second component process stream containing component C and essentially all of component B.

12. The method of claim 11, whereby one of the first process stream and the second process stream is liquid, and the other of the first process stream and the second process stream is liquid or vapor.

13. The method of claim 1, wherein the component separation unit is a distillation unit, and the cellular solid material is randomly packed to custom fit the cross sectional configuration of the distillation unit.

14. The method of claim 13, wherein the cellular solid material has a diameter that is greater than 0.25 inches.

15. The method of claim 1, wherein the component separation unit is a distillation unit, and the cellular solid material is formed into an assembled bed that is custom fit to the cross sectional configuration of the distillation unit.

16. The method of claim 15, wherein the cellular solid material has a diameter that is greater than 0.25 inches.

17. The method of claim 1, wherein the component separation unit is a distillation unit and the cellular solid material is inert.

18. The method of claim 1, wherein the stochastic cellular solid material has a random topology and is comprised of ceramics, metals, polymers or mixtures thereof.

19. The method of claim 1, wherein the component separation unit is an absorber.

20. The method of claim 1, wherein the component separation unit is an adsorber.

21. A component separation unit assembly, the assembly comprising a unit having a stochastic three dimensional cellular solid material having a solid component and one or more cells disposed therewithin and having a surface upon which two or more phases from at least one process stream are contacted to facilitate mass transfer, wherein the cellular solid material has a pore size in the range of about 100 microns to about 6,000 microns.

22. The assembly of claim 21, wherein the cellular solid material has a plurality of cell sizes and shapes.

23. The assembly of claim 21, wherein the component separation unit is a distillation unit.

24. The assembly of claim 23, wherein the cellular solid material is randomly packed to custom fit the cross sectional configuration of the distillation unit.

25. The assembly of claim 24, wherein the cellular solid material has a diameter that is greater than 0.25 inches.

26. The assembly of claim 23, wherein the cellular solid material is formed into a bed that is custom fit to the cross sectional configuration of the distillation unit.

27. The assembly of claim 26, wherein the cellular solid material has a diameter that is greater than 0.25 inches.

28. The assembly of claim 23, wherein the cellular solid material comprises a reticulated element that spans the entire inner cross section of the distillation unit.

29. The assembly of claim 23, wherein the cellular solid material comprises a reticulated element that spans the entire length of the distillation unit.

30. The assembly of claim 21, wherein the phases comprise at least one liquid phase and at least one vapor phase.

31. The assembly of claim 21 wherein the surface of the cellular solid material has a surface area in the range of about 250-4000 square meters per cubic meter of cellular solid material in the unit.

32. The assembly of claim 21, wherein the cellular solid material is selected from the group consisting of oxides, carbides, nitrides, borides, a ceramic material, a metallic material, a polymeric material and a chemical vapor deposition material.

33. The assembly of claim 21, wherein the cellular solid material is formed from a corrosion resistant material.

34. The assembly of claim 21, wherein the cellular solid material is predominantly formed from silicon carbide.

35. The assembly of claim 21, wherein the unit contains one or more conventional unit internals.

36. The assembly of claim 21, wherein the cellular solid material has a porosity in the range of about 4 to about 30 pores per inch.

37. The assembly of claim 21, wherein the component separation unit is a distillation unit.

38. The assembly of claim 21, wherein the component separation unit is a distillation unit and the cellular solid material is inert.

39. The assembly of claim 21, wherein the stochastic cellular solid material has a random topology and is comprised of ceramics, metals, polymers or mixtures thereof.

40. The assembly of claim 21, wherein the component separation unit is an absorber.

41. The assembly of claim 21, wherein the component separation unit is an adsorber.

* * * * *